(12) United States Patent
Chen et al.

(10) Patent No.: US 8,649,115 B2
(45) Date of Patent: Feb. 11, 2014

(54) OPTICAL IMAGE LENS ASSEMBLY

(75) Inventors: Chun-Shan Chen, Taichung (TW);
Chih-Wen Hsu, Taichung (TW);
Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 13/615,787

(22) Filed: Sep. 14, 2012

(65) Prior Publication Data
US 2013/0235463 A1    Sep. 12, 2013

(30) Foreign Application Priority Data
Mar. 8, 2012 (TW) .............................. 101107896 A

(51) Int. Cl.
*G02B 13/18* (2006.01)
*G02B 9/60* (2006.01)

(52) U.S. Cl.
USPC ............ 359/716; 359/740; 359/763; 359/765

(58) Field of Classification Search
USPC .................. 359/714, 740, 763, 765
See application file for complete search history.

(56) References Cited

U.S. PATENT DOCUMENTS 8,411,376 B2 * 4/2013 Kubota .......................... 359/764
8,488,255 B2 * 7/2013 Tsai .............................. 359/714

* cited by examiner

*Primary Examiner* — Evelyn A. Lester
(74) *Attorney, Agent, or Firm* — CKC & Partners Co., Ltd.

(57) ABSTRACT

An optical image lens assembly includes, in order from an object side to an image side, a first lens element, a second lens element, a third lens element, a fourth lens element and a fifth lens element. The first lens element with positive refractive power has a convex object-side surface and a convex image-side surface. The second lens element with refractive power has a concave object-side surface and a convex image-side surface. The third lens element with refractive power has two surfaces being aspheric. The fourth lens element with positive refractive power has a convex image-side surface, wherein the surfaces of the fourth lens element are aspheric. The fifth lens element with negative refractive power has a concave image-side surface, wherein the surfaces of the fifth lens element are aspheric, and the fifth lens element has inflection points on at least one of the surfaces thereof.

27 Claims, 20 Drawing Sheets

OPTICAL IMAGE LENS ASSEMBLY

RELATED APPLICATIONS

The application claims priority to Taiwan Application Serial Number 101107896, filed Mar. 8, 2012, which is herein incorporated by reference

BACKGROUND

1. Technical Field

The present invention relates to an optical image lens assembly. More particularly, the present invention relates to a compact optical image lens assembly applicable to electronic products.

2. Description of Related Art

In recent years, with the popularity of mobile products with camera functionalities, the demand for miniaturizing an optical lens system is increasing. The sensor of a conventional photographing camera is typically a CCD (Charge-Coupled Device) or a CMOS (Complementary Metal-Oxide-Semiconductor) sensor. As advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a four-element lens structure, such as U.S. Pat. No. 7,869,142. Due to the popularity of mobile products with high-end specifications, such as smart phones and PDAs (Personal Digital Assistants), the pixel and image-quality requirements of the compact optical lens system have increased rapidly. However, the conventional four-element lens structure cannot satisfy the requirements of the compact optical lens system.

Another conventional compact optical lens system has five-element lens structure, such as U.S. Pat. No. 7,911,711. However, it cannot effectively reduce the total track length of the optical lens system by providing a convex object-side surface on a first lens element which is closest to the object. Moreover, the refractive power of the first lens element cannot be balanced by the excessive difference of the curvature between the object-side surface and the image-side surface thereof, so that the aberration and the spherical aberration of the optical lens system would be generated and decreasing the image quality.

SUMMARY

According to one aspect of the present disclosure, an optical image lens assembly includes, in order from an object side to an image side, a first lens element, a second lens element, a third lens element, a fourth lens element and a fifth lens element. The first lens element with positive refractive power has a convex object-side surface and a convex image-side surface. The second lens element with refractive power has a concave object-side surface and a convex image-side surface. The third lens element with refractive power has an object-side surface and an image-side surface being aspheric. The fourth lens element with positive refractive power has a convex image-side surface, wherein an object-side surface and the image-side surface of the fourth lens element are aspheric. The fifth lens element with negative refractive power has a concave image-side surface, wherein an object-side surface and the image-side surface of the fifth lens element are aspheric, and the fifth lens element has at least one inflection point on at least one of the object-side surface and the image-side surface thereof. When a curvature radius of the object-side surface of the first lens element is R1, a curvature radius of the image-side surface of the first lens element is R2, a curvature radius of the object-side surface of the second lens element is R3, a curvature radius of the image-side surface of the second lens element is R4, a curvature radius of the image-side surface of the third lens element is R6, and an axial distance between the third lens element and the fourth lens element is T34, the following relationships are satisfied:

$-1.0 \le R2/R1 < 0;$ $-1.0 < (R3-R4)/(R3+R4) < 1.0,$ and $-8.0 < (T34/R6) \times 100 < 0.5.$ According to another aspect of the present disclosure, an optical image lens assembly includes, in order from an object side to an image side, a first lens element, a second lens element, a third lens element, a fourth lens element and a fifth lens element. The first lens element with positive refractive power has a convex object-side surface and a convex image-side surface. The second lens element with refractive power has a concave object-side surface and a convex image-side surface. The third lens element with refractive power has an object-side surface and an image-side surface being aspheric. The fourth lens element with positive refractive power has a convex image-side surface, wherein an object-side surface and the image-side surface of the fourth lens element are aspheric. The fifth lens element with negative refractive power has a convex object-side surface and a concave image-side surface, wherein the object-side surface and the image-side surface of the fifth lens element are aspheric, and the fifth lens element has at least one inflection point on at least one of the object-side surface and the image-side surface thereof. When a curvature radius of the object-side surface of the first lens element is R1, a curvature radius of the image-side surface of the first lens element is R2, a curvature radius of the object-side surface of the second lens element is R3, a curvature radius of the image-side surface of the second lens element is R4, an to axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a curvature radius of the object-side surface of the fifth lens element is R9, and a focal length of the optical image lens assembly is f, the following relationships are satisfied:

$-1.0 \le R2/R1 < 0;$ $-1.0 < (R3-R4)/(R3+R4) < 1.0,$ $0 < (T34+T45)/(T12+T23) < 1.9;$ and $0 < R9/f < 2.0.$ According to yet another aspect of the present disclosure, an optical image lens assembly includes, in order from an object side to an image side, a first lens element, a second lens element, a third lens element, a fourth lens element and a fifth lens element. The first lens element with positive refractive power has a convex object-side surface and a convex image-side surface. The second lens element with negative refractive power has a concave object-side surface and a convex image-side surface, wherein the object-side surface and the image-side surface of the second lens element are aspheric. The third lens element with refractive power has an object-side surface and an image-side surface being aspheric. The fourth lens element with positive refractive power has a convex image-side surface, wherein an object-side surface and the image-side surface of the fourth lens element are aspheric. The fifth lens element with negative refractive power has a concave image-side surface, wherein an object-side surface and the image-side surface of the fifth lens element are aspheric, and the fifth lens element has at least one inflection point on at least of the object-side surface and the image-side surface thereof. When a curvature radius of the object-side surface of the first lens element is R1, a curvature radius of the image-side surface of the first lens element is R2, a curvature radius of the object-side surface of the second lens element is R3, a curvature radius of the image-side surface of the second lens element is R4, a curvature radius of the image-side surface of the third lens element is R6, and an axial distance between the third lens element and the fourth lens element is T34, the following relationships are satisfied:

$$-2.0 < R2/R1 < 0;$$

$$-1.0 < (R3-R4)/(R3+R4) < 1.0; \text{ and}$$

$$-8.0 < (T34/R6) \times 100 < 0.5$$

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
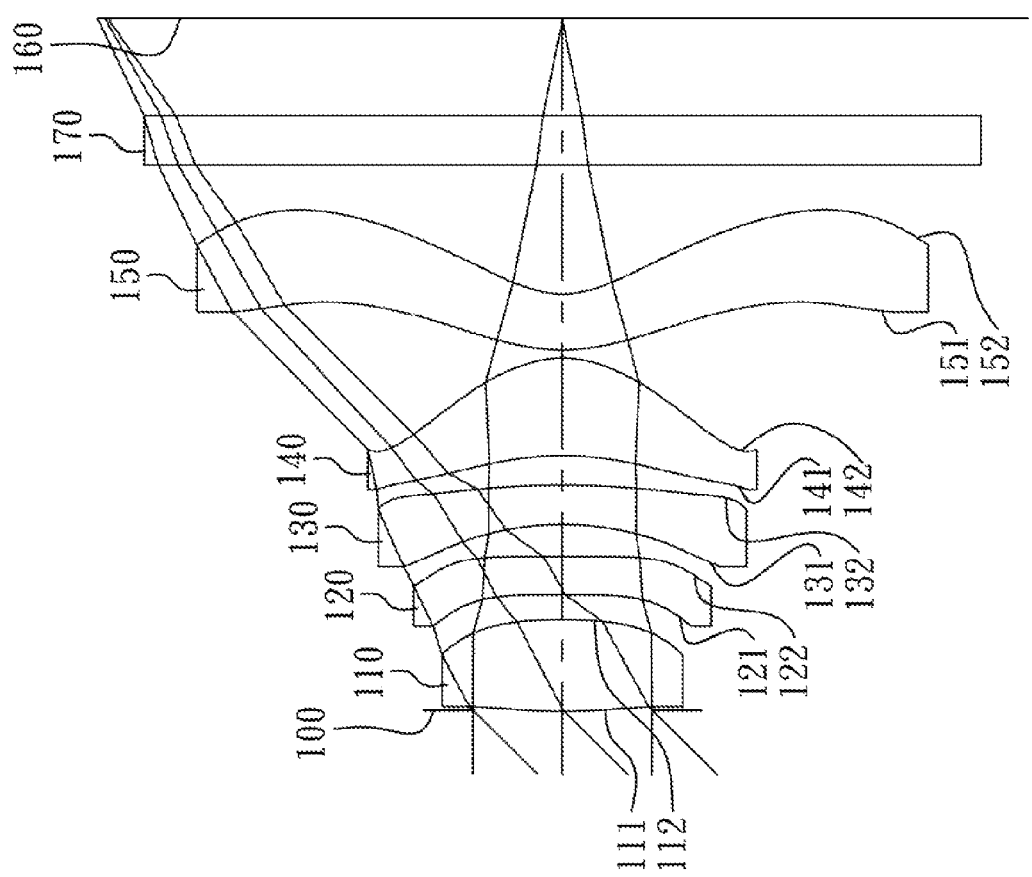
FIG. 1 is a schematic view of an optical image lens assembly according to the 1st embodiment of the present disclosure.

An optical image lens assembly includes, in order from an object side to an image side, a first lens element, a second lens element, a third lens element, a fourth lens element and a fifth lens element.

The first lens element with positive refractive power has a convex object-side surface and a convex image-side surface, so that the positive refractive power of the first lens element is proper for reducing the total track length of the optical image lens assembly. Moreover, the first lens element has at least one inflection point on the object-side surface thereof, so that the incident angle of the off-axis field into the optical image lens assembly and the aberration can be effectively reduced.

The second lens element with negative refractive power has a concave object-side surface and a convex image-side surface, so that the aberration generated from the first lens element with positive refractive power and the astigmatism of the optical image lens assembly can be corrected.

The third lens element with negative refractive power can reduce the high order aberration of the optical image lens assembly. When the third lens element has a concave object-side surface and a convex image-side surface, the astigmatism of the optical image lens assembly can be corrected.

The fourth lens element with positive refractive power can balance the positive power distribution of the optical image lens assembly so as to reduce the sensitivity of the optical image lens assembly. The fourth lens element has a concave object-side surface and a convex image-side surface, so that the astigmatism of the optical image lens assembly can be corrected.

The fifth lens element with negative refractive power has a concave image-side surface, so that the principal point of the optical image lens assembly can be positioned away from the image plane, and the total track length of the optical image lens assembly can be reduced so as to maintain the compact size of the optical image lens assembly. The fifth lens element has at least one inflection point on at least of the object-side surface and the image-side surface thereof, so that so that the incident angle of the off-axis field on an image sensor can be effectively reduced and the aberration can be further corrected as ell.

When a curvature radius of the object-side surface of the first lens element is R1, and a curvature radius of the image-side surface of the first lens element is R2, the following relationship is satisfied:

$$-2.0 < R2/R1 < 0.$$

By such arrangement, the shape of the surfaces of the first lens element is proper. The convex object-side surface and the convex image-side surface of the first lens element can enhance the refractive power thereof, so that the optical image lens assembly can retain the telephoto characteristic for further reducing the total track length of the optical image lens assembly applied to compact electronic products. Furthermore, the refractive power can be evenly distributed on the surfaces of the first lens element, so that the aberration generated from the excessive surface curvature can be reduced, and the spherical aberration of the optical image lens assembly can also be corrected for enhancing the image quality.

R2 and R1 can further satisfy the following relationship:

$$-1.0 \leq R2/R1 < 0.$$

When a curvature radius of the object-side surface of the second lens element is R3, and a curvature radius of the image-side surface of the second lens element is R4, the following relationship is satisfied:

$$-1.0 < (R3-R4)/(R3+R4) < 1.0.$$

Therefore, the negative refractive power of the second lens element is proper by adjusting the curvature of the surfaces of the second lens element, so that the second lens element can retain the ability for correcting the aberration, and the spherical aberration of the optical image lens assembly can be also corrected.

When a curvature radius of the image-side surface of the third lens element is R6, and an axial distance between the third lens element and the fourth lens element is T34, the following relationship is satisfied:

$$-8.0 < (T34/R6) \times 100 < 0.5.$$

Therefore, the fabricated yield of the optical image lens assembly can increase by adjusting the distance between the third lens element and the fourth lens element and the curvature of the image-side surface of the third lens element.

T34 and R6 can further satisfy the following relationship:

$$-6.0 < (T34/R6) \times 100 < 0.$$

When the curvature radius of the image-side surface of the second lens element is R4, and a curvature radius of the object-side surface of the third lens element is R5, the following relationship is satisfied:

$$0 < R5/R4 < 0.80.$$

By such arrangement, when the second lens element has positive refractive power and the third lens element has negative refractive power, the aberration of the optical image lens assembly can be corrected. When the second lens element and the third lens element have negative refractive power, the sensitivity of the optical image lens assembly can be reduced by balancing the distribution of the negative refractive power thereof.

R5 and R4 can further satisfy the following relationship:

$$0 < R5/R4 < 0.50.$$

When a focal length of the optical image lens assembly is f, and a focal length of the second lens element is f2, the following relationship is satisfied:

$$-0.50 < f/f2 < 0.50.$$

Therefore, the second lens element with proper refractive power can correct the aberration generated from the first lens element with positive refractive power effectively.

f and f2 can further satisfy the following relationship:

$$-0.50 < f/f2 < 0.$$

When an Abbe number of the first lens element is V1, an Abbe number of the second lens element is V2, and an Abbe number of the third lens element is V3, the following relationship is satisfied.

$$0 < (V2+V3)/V1 < 1.0.$$

Therefore, the chromatic aberration of the optical image lens assembly can be corrected.

When an axial distance between the object-side surface of the first lens element and the image-side surface of the fifth lens element is TD, the following relationship is satisfied:

$$2.0 \text{ mm} < TD < 4.5 \text{ mm}.$$

Therefore, the total track length of the optical image lens assembly can be reduced so as to maintain the compact size thereof.

When an axial distance between the first lens element and the second lens element is T12, an axial distance between the second lens element and the third lens element is T23, the axial distance between the third lens element and the fourth lens element is T34, and an axial distance between the fourth lens element and the fifth lens element is T45, the following relationship is satisfied:

$$0 < (T34+T45)/(T12+T23) < 1.9.$$

Therefore, the fabricated yield of the optical image lens assembly can increase by adjusting the distance between lens elements.

When a half of the maximal field of view of the optical image lens assembly is HFOV, the following relationship is satisfied:

$$38 \text{ degrees} < HFOV < 60 \text{ degrees}.$$

When the optical image lens assembly has excessive field of view, the deformation at the peripheral region of the image would be obvious. When the optical image lens assembly has insufficient field of view, the image capturing range would be restricted. Therefore, the proper field of view can provide the proper image capturing range and increase the image quality.

HFOV can further satisfy the following relationship:

$$40 \text{ degrees} < HFOV < 50 \text{ degrees}.$$

When a curvature radius of the object-side surface of the fifth lens element is R9, and a focal length of the optical image lens assembly is f, the following relationship is satisfied:

$$0 < R9/f < 2.0.$$

Therefore, the Petzval Sum of the optical image lens assembly can be corrected for smoothing the peripheral area of the image.

According to the optical image lens assembly of the present disclosure, the lens elements thereof can be made of glass or plastic material. When the lens elements are made of glass material, the distribution of the refractive power of the optical image lens assembly may be more flexible to design. When the lens elements are made of plastic material, the cost of manufacture can be effectively reduced. Furthermore, the surface of each lens element can be aspheric, so that it is easier to make the surface into non-spherical shapes. As a result, more controllable variables are obtained, and the aberration is reduced, as well as the number of required lens elements can be reduced while constructing an optical system. Therefore, the total track length of the optical image lens assembly can also be reduced.

According to the optical image lens assembly of the present disclosure, when the lens element has a convex surface, it indicates that the paraxial region of the surface is convex, and when the lens element has a concave surface, it indicates that the paraxial region of the surface is concave.

According to the optical image lens assembly of the present disclosure, the optical image lens assembly can include at least one stop, such as an aperture stop, glare stop, field stop, etc. Said glare stop or said field stop is allocated for reducing stray light while retaining high image quality. Furthermore, when a stop is an aperture stop, the position of the aperture stop within an optical system can be arbitrarily placed in front of the entire lens assembly, within the lens assembly, or in front of the image plane in accordance with the preference of the optical designer, in order to achieve the desirable optical features or higher image quality produced from the optical system.

According to the above description of the present disclosure, the following 1st-10th specific embodiments are provided for further explanation.

1st Embodiment

Figure 2:
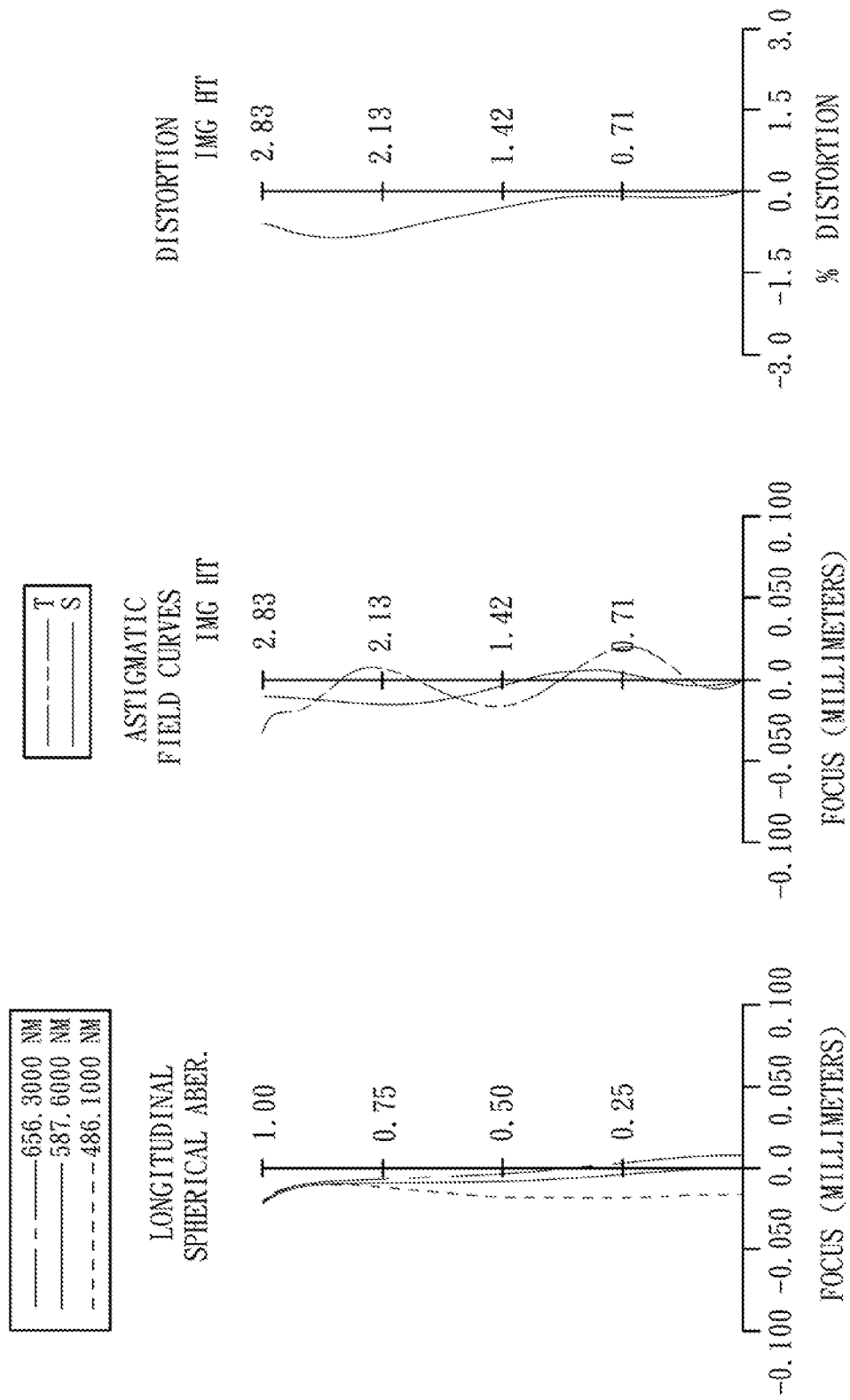
FIG. 2 shows spherical aberration curves, astigmatic field curves and a distortion curve of the optical image lens assembly according to the 1st embodiment.

FIG. 1 is a schematic view of an optical image lens assembly according to the 1st embodiment of the present disclosure. FIG. 2 shows spherical aberration curves, astigmatic field curves and a distortion curve of the optical image lens assembly according to the 1st embodiment. In FIG. 1, the optical image lens assembly includes, in order from an object side to an image side, an aperture stop 100, the first lens element 110, the second lens element 120, the third lens element 130, the fourth lens element 140, the fifth lens element 150, an IR-cut filter 170 and an image plane 160.

The first lens element 110 with positive refractive power has a convex object-side surface 111 and a convex image-side surface 112, and is made of plastic material. The object-side surface 111 and the image-side surface 112 of the first lens element 110 are aspheric. Furthermore, the first lens element 110 has inflection points on the object-side surface 111 thereof.

The second lens element 120 with negative refractive power has a concave object-side surface 121 and a convex image-side surface 122, and is made of plastic material. The object-side surface 121 and the image-side surface 122 of the second lens element 120 are aspheric.

The third lens element 130 with negative refractive power has a concave object-side surface 131 and a convex image-side surface 132, and is made of plastic material. The object-side surface 131 and the image-side surface 132 of the third lens element 130 are aspheric.

The fourth lens element 140 with positive refractive power has a concave object-side surface 141 and a convex image-side surface 142, and is made of plastic material. The object-side surface 141 and the image-side surface 142 of the fourth lens element 140 are aspheric.

The fifth lens element 150 with negative refractive power has a convex object-side surface 151 and a concave image-side surface 152, and is made of plastic material. The object-side surface 151 and the image-side surface 152 of the fifth lens element 150 are aspheric. Furthermore, the fifth lens element 150 has inflection points on the object-side surface 151 and the image-side surface 152 thereof.

The IR-cut filter 170 is made of glass, and located between the fifth lens element 150 and the image plane 160, and will not affect the focal length of the optical image lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

wherein,

X is the distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius:

k is the conic coefficient; and

Ai is the i-th aspheric coefficient.

In the optical image lens assembly according to the 1st embodiment, when a focal length of the optical image lens assembly is f, an f-number of the optical image lens assembly is Fno, and half of the maximal field of view is HFOV, these parameters have the following values:

$f=2.83$ mm;

$Fno=2.55$; and $HFOV=45.3$ degrees.

In the optical image lens assembly according to the 1st embodiment, when an Abbe number of the first lens element 110 is V1, an Abbe number of the second lens element 120 is V2, and an Abbe number of the third lens element 130 is V3, the following relationship is satisfied:

$(V2-V3)/V1=0.83$.

In the optical image lens assembly according to the 1st embodiment, when a curvature radius of the object-side surface 111 of the first lens element 110 is R1, a curvature radius of the image-side surface 112 of the first lens element 110 is R2, a curvature radius of the object-side surface 121 of the second lens element 120 is R3, a curvature radius of the image-side surface 122 of the second lens element 120 is R4, and a curvature radius of the object-side surface 131 of the third lens element 130 is R5, the following relationships are satisfied:

$R2/R1=-0.89$;

$(R3-R4)/(R3+R4)=-0.49$; and $R5/R4=0.02$.

In the optical image lens assembly according to the 1st embodiment, when a curvature radius of the object-side surface 151 of the fifth lens element 150 is R9, and a focal length of the optical image lens assembly is f, the following relationship is satisfied:

$R9/f=0.41$.

In the optical image lens assembly according to the 1st embodiment, when a curvature radius of the image-side surface 132 of the third lens element 130 is R6, and an axial distance between the third lens element 130 and the fourth lens element 140 is T34, the following relationship is satisfied:

$$(T34/R6) \times 100 = -3.63.$$

In the optical image lens assembly according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, and an axial distance between the fourth lens element 140 and the fifth lens element 150 is T45, the following relationship is satisfied:

$$(T34+T45)/(T12+T23) = 0.66.$$

In the optical image lens assembly according to the 1st embodiment, when the focal length of the optical image lens assembly is f, and a focal length of the second lens element 120 is f2, the following relationship is satisfied:

$$f/f2 = -0.03.$$

In the optical image lens assembly according to the 1st embodiment, when an axial distance between the object-side surface 111 of the first lens element 110 and the image-side surface 152 of the fifth lens element 150 is TD, the following relationship is satisfied:

$$TD = 2.59 \text{ mm}.$$

The detailed optical data of the 1st embodiment are shown in Table 1 and the aspheric surface data are shown in Table 2 below.

TABLE 1

1st Embodiment
f = 2.83 mm, Fno = 2.55, HFOV = 45.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.008 | | | | |
| 2 | Lens 1 | 3.548 (ASP) | 0.568 | Plastic | 1.544 | 55.9 | 3.16 |
| 3 | | −3.152 (ASP) | 0.154 | | | | |
| 4 | Lens 2 | −34.168 (ASP) | 0.240 | Plastic | 1.640 | 23.3 | −81.24 |
| 5 | | −100.000 (ASP) | 0.199 | | | | |
| 6 | Lens 3 | −1.779 (ASP) | 0.240 | Plastic | 1.640 | 23.3 | −4.42 |
| 7 | | −5.062 (ASP) | 0.184 | | | | |
| 8 | Lens 4 | −1.756 (ASP) | 0.604 | Plastic | 1.544 | 55.9 | 1.56 |
| 9 | | −0.642 (ASP) | 0.050 | | | | |
| 10 | Lens 5 | 1.160 (ASP) | 0.350 | Plastic | 1.544 | 55.9 | −2.25 |
| 11 | | 0.532 (ASP) | 0.800 | | | | |
| 12 | IR-cut filter | Plano | 0.300 | Glass | 1.517 | 64.2 | — |
| 13 | | Plano | 0.607 | | | | |
| 14 | Image | Plano | — | | | | |

Note:
Reference wavelength (d-line) is 587.6 nm.

TABLE 2

Aspheric Coefficients

| | Surface # | | | | |
|---|---|---|---|---|---|
| | 2 | 3 | 4 | 5 | 6 |
| k = | −2.1364E+01 | −1.0000E+00 | −1.0000E+00 | −1.0000E+00 | −8.3936E+00 |
| A4 = | −3.4793E−02 | −3.6692E−01 | −3.3558E−01 | −1.9653E−02 | −9.0280E−02 |
| A6 = | −2.2251E−01 | −1.0894E−01 | −5.6043E−01 | −5.9161E−01 | −7.0920E−02 |
| A8 = | 7.7268E−02 | 2.9003E−01 | 6.9550E−01 | 4.5847E−01 | −1.1506E−01 |
| A10 = | −4.8894E−01 | −2.5628E−01 | −6.5552E−01 | −3.6256E−01 | 3.8508E−01 |
| A12 = | 3.3207E−02 | −2.8744E−01 | 9.6871E−01 | 1.5349E−01 | −1.8048E−01 |
| A14 = | −7.8812E−02 | 1.4813E−01 | −3.2518E−01 | 1.8598E−01 | |

| | Surface # | | | | |
|---|---|---|---|---|---|
| | 7 | 8 | 9 | 10 | 11 |
| k = | −1.3911E+00 | 9.4292E−01 | −3.2841E+00 | −4.6737E+00 | −3.7985E+00 |
| A4 = | 4.2634E−02 | 1.5118E−01 | −2.8096E−01 | −6.9165E−02 | −7.5496E−02 |
| A6 = | −1.0897E−01 | 1.3017E−01 | 2.7367E−01 | 1.7111E−02 | 2.8606E−02 |
| A8 = | 1.4787E−01 | −2.5371E−01 | −1.4356E−01 | −3.6355E−03 | −9.8847E−03 |
| A10 = | −5.4290E−03 | 2.5531E−01 | 6.1737E−02 | 1.1181E−04 | 2.1546E−03 |
| A12 = | −5.3279E−02 | −1.2488E−01 | 5.8887E−03 | 1.4122E−04 | −2.7442E−04 |
| A14 = | | 2.3716E−02 | −4.5710E−03 | −1.7252E−05 | 1.5383E−05 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 applies also to the Tables for the remaining embodiments, and so an explanation in this regard will not be provided again.

2nd Embodiment

Figure 3:
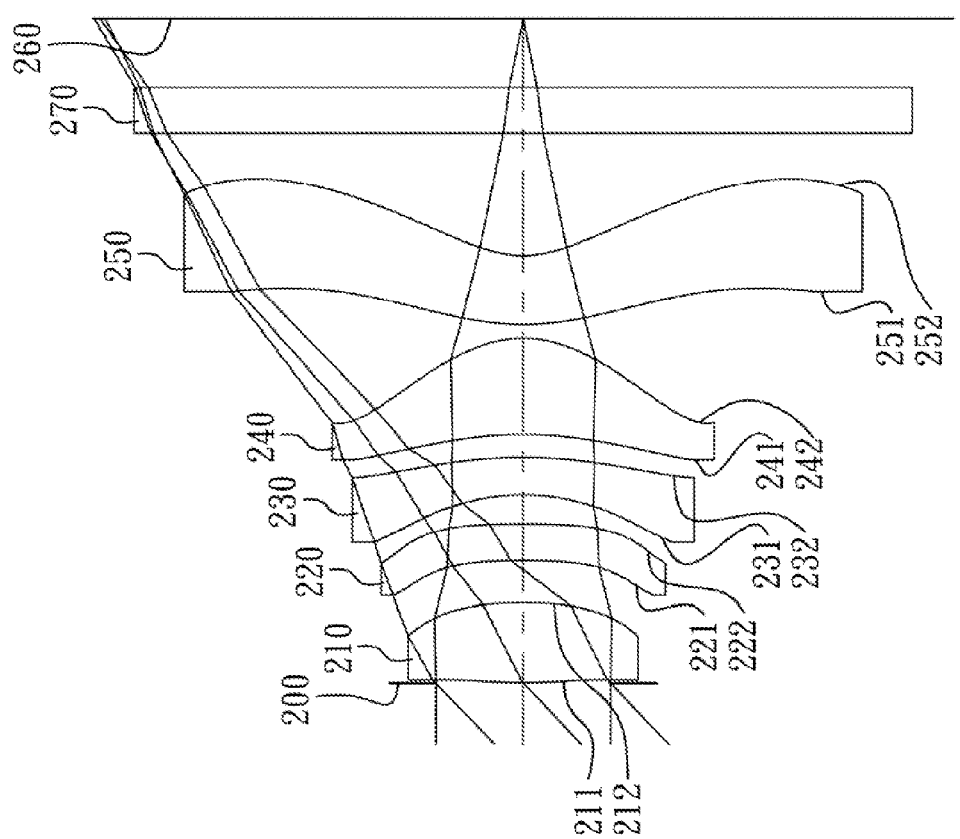
FIG. 3 is a schematic view of an optical image lens assembly according to the 2nd embodiment of the present disclosure.
Figure 4:
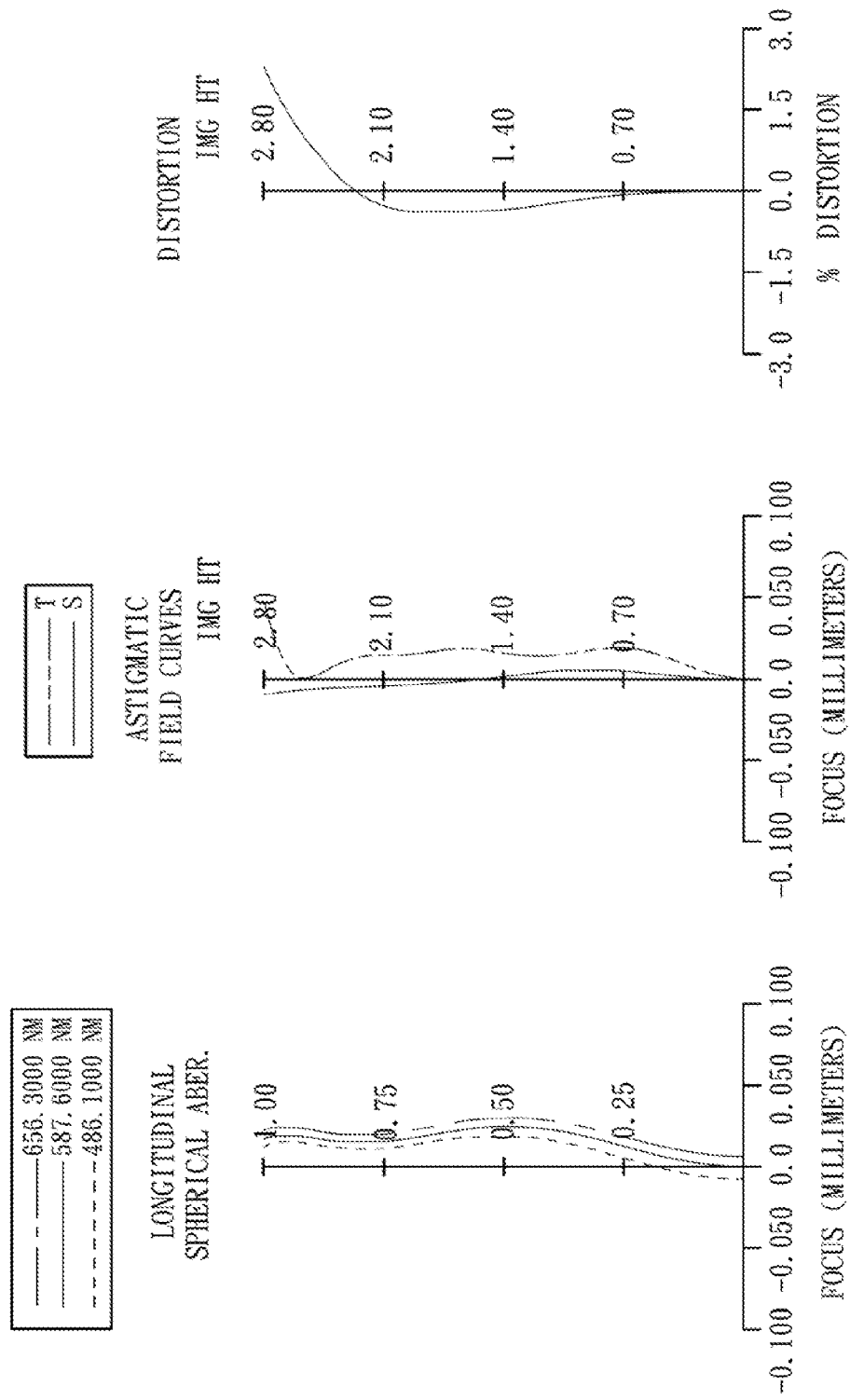
FIG. 4 shows spherical aberration curves, astigmatic field curves and a distortion curve of the optical image lens assembly according to the 2nd embodiment.

FIG. 3 is a schematic view of an optical image lens assembly according to the 2nd embodiment of the present disclosure. FIG. 4 shows spherical aberration curves, astigmatic field curves and a distortion curve of the optical image lens assembly according to the 2nd embodiment. In FIG. 3, the optical image lens assembly includes, in order from an object side to an image side, an aperture stop 200, the first lens element 210, the second lens element 220, the third lens element 230, the fourth lens element 240, the fifth lens element 250, an IR-cut filter 270 and an image plane 260.

The first lens element 210 with positive refractive power has a convex object-side surface 211 and a convex image-side surface 212, and is made of plastic material. The object-side surface 211 and the image-side surface 212 of the first lens element 210 are aspheric. Furthermore, the first lens element 210 has inflection points on the object-side surface 211 thereof.

The second lens element 220 with negative refractive power has a concave object-side surface 221 and a convex image-side surface 222, and is made of plastic material. The object-side surface 221 and the image-side surface 222 of the second lens element 220 are aspheric.

The third lens element 230 with negative refractive power has a concave object-side surface 231 and a convex image-side surface 232, and is made of plastic material. The object-side surface 231 and the image-side surface 232 of the third lens element 230 are aspheric.

The fourth lens element 240 with positive refractive power has a concave object-side surface 241 and a convex image-side surface 242, and is made of plastic material. The object-side surface 241 and the mage-side surface 242 of the fourth lens element 240 are aspheric.

The fifth lens element 250 with negative refractive power has a convex object-side surface 251 and a concave image-side surface 252, and is made of plastic material. The object-side surface 251 and the image-side surface 252 of the fifth lens element 250 are aspheric. Furthermore, the fifth lens element 250 has inflection points on the object-side surface 251 and the image-side surface 252 thereof.

The IR-cut filter 270 is made of glass, and located between the fifth lens element 250 and the image plane 260, and will not affect the focal length of the optical image lens assembly.

The detailed optical data of the 2nd embodiment are shown in Table 3 and the aspheric surface data are shown in Table 4 below

TABLE 3

2nd Embodiment
f = 2.85 mm, Fno = 2.50, HFOV = 43.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.004 | | | | |
| 2 | Lens 1 | 3.974 (ASP) | 0.524 | Plastic | 1.535 | 56.3 | 2.94 |
| 3 | | −2.484 (ASP) | 0.274 | | | | |
| 4 | Lens 2 | −5.449 (ASP) | 0.240 | Plastic | 1.583 | 30.2 | −58.00 |
| 5 | | −6.600 (ASP) | 0.192 | | | | |
| 6 | Lens 3 | −1.352 (ASP) | 0.241 | Plastic | 1.650 | 21.4 | −3.88 |
| 7 | | −3.124 (ASP) | 0.151 | | | | |
| 8 | Lens 4 | −2.388 (ASP) | 0.629 | Plastic | 1.535 | 56.3 | 1.63 |
| 9 | | −0.697 (ASP) | 0.090 | | | | |
| 10 | Lens 5 | 1.699 (ASP) | 0.448 | Plastic | 1.535 | 56.3 | −2.27 |
| 11 | | 0.643 (ASP) | 0.800 | | | | |
| 12 | IR-cut filter | Plano | 0.300 | Glass | 1.517 | 64.2 | — |
| 13 | | Plano | 0.449 | | | | |
| 14 | Image | Plano | — | | | | |

Note:
Reference wavelength (d-line) is 587.6 nm.

TABLE 4

Aspheric Coefficients

| Surface # | | | | |
|---|---|---|---|---|
| 2 | 3 | 4 | 5 | 6 |
| k = −4.9340E+01 | −8.1699E+00 | −2.0870E+00 | −4.7191E+00 | −4.1075E+00 |
| A4 = −6.2132E−02 | −3.2268E−01 | −3.4011E−01 | −1.1223E−01 | −6.5422E−02 |
| A6 = −1.1691E−01 | −1.8176E−01 | −3.7704E−01 | −5.1020E−01 | −8.1522E−02 |
| A8 = −5.3909E−01 | 3.6315E−01 | 7.9275E−01 | 5.5402E−01 | −1.2270E−01 |
| A10 = 2.9065E−01 | −2.6323E−01 | −1.0478E+00 | −5.0735E−01 | 4.7883E−01 |

TABLE 4-continued

| Aspheric Coefficients | | | | | |
|---|---|---|---|---|---|
| A12 = | 3.3207E−02 | −2.9450E−01 | 1.2851E+00 | 2.1950E−01 | −2.5228E−01 |
| A14 = | −7.8812E−02 | 1.4813E−01 | −3.2518E−01 | 1.7400E−01 | |

| | Surface # | | | | |
|---|---|---|---|---|---|
| | 7 | 8 | 9 | 10 | 11 |
| k = | −1.0046E+00 | 2.5845E+00 | −3.1246E+00 | −5.1581E+00 | −4.1481E+00 |
| A4 = | 4.8830E−02 | 9.3358E−02 | −2.0737E−01 | −5.6633E−02 | −6.3626E−02 |
| A6 = | −9.5546E−02 | 1.0335E−01 | 2.4390E−01 | 8.7068E−03 | 2.4059E−02 |
| A8 = | 1.3581E−01 | −2.5117E−01 | −1.5109E−01 | −1.3915E−04 | −8.3812E−03 |
| A10 = | −4.4834E−02 | 2.6629E−01 | 6.4801E−02 | −4.8409E−06 | 1.8729E−03 |
| A12 = | −5.1186E−03 | −1.3400E−01 | 9.6902E−04 | −4.2037E−05 | −2.3367E−04 |
| A14 = | | 3.2600E−02 | −4.3998E−03 | 7.0547E−06 | 1.2062E−05 |

In the optical image lens assembly according to the 2nd embodiment, the definitions of f, Fno, FOV, V1, V2, V3, R1, R2, R3, R4, R5, R6, R9, f2, T12 T23, T34, T45 and TD are the same as those stated in the 1st embodiment with corresponding values for the 2nd embodiment. Moreover, these parameters can be calculated from Table 3 and Table 4 as the following values and satisfy the following relationships:

| f (mm) | 2.85 | R5/R4 | 0.20 |
|---|---|---|---|
| Fno | 2.50 | R9/f | 0.60 |
| HFOV (deg.) | 43.7 | (T34/R6) × 100 | −4.83 |
| (V2 + V3)/V1 | 0.92 | (T34 + T45)/(T12 + T23) | 0.52 |
| R2/R1 | −0.63 | f/f2 | −0.05 |
| (R3 − R4)/(R3 + R4) | −0.10 | TD (mm) | 2.79 |

3rd Embodiment

Figure 5:
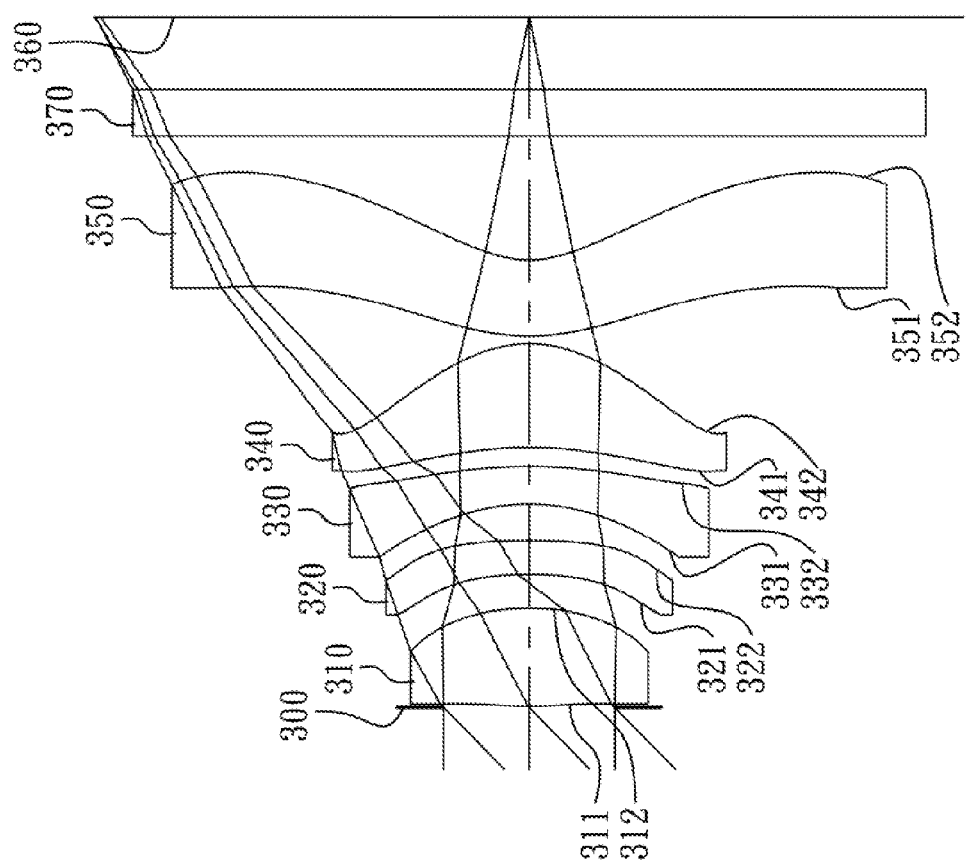
FIG. 5 is a schematic view of an optical image lens assembly according to the 3rd embodiment of the present disclosure.
Figure 6:
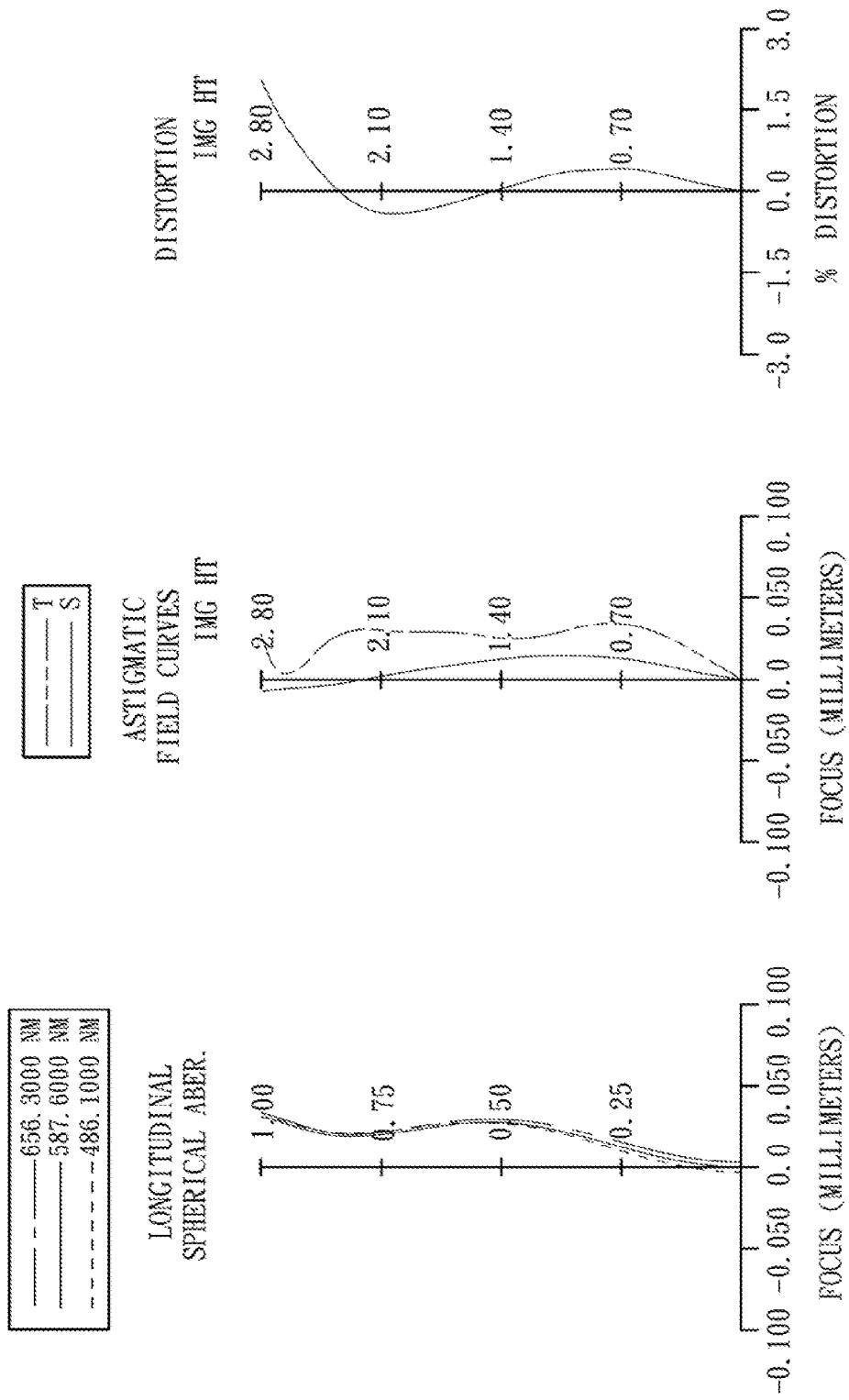
FIG. 6 shows spherical aberration curves, astigmatic field curves and a distortion curve of the optical image lens assembly according to the 3rd embodiment.

FIG. 5 is a schematic view of an optical image lens assembly according to the 3rd embodiment of the present disclosure. FIG. 6 shows spherical aberration curves, astigmatic field curves and a distortion curve of the optical image lens assembly according to the 3rd embodiment. In FIG. 5, the optical image lens assembly includes, in order from an object side to an image side, an aperture stop 300, the first lens element 310, the second lens element 320, the third lens element 330, the fourth lens element 340, the fifth lens element 350, an IR-cut filter 370 and an image plane 360.

The first lens element 310 with positive refractive power has a convex object-side surface 311 and a convex image-side surface 312, and is made of plastic material. The object-side surface 311 and the image-side surface 312 of the first lens element 310 are aspheric. Furthermore, the first lens element 310 has inflection points on the object-side surface 311 thereof.

The second lens element 320 with negative refractive power has a concave object-side surface 321 and a convex image-side surface 322, and is made of plastic material. The object-side surface 321 and the image-side surface 322 of the second lens element 320 are aspheric.

The third lens element 330 with negative refractive power has a concave object-side surface 331 and a convex image-side surface 332, and is made of plastic material. The object-side surface 331 and the image-side surface 332 of the third lens element 330 are aspheric.

The fourth lens element 340 with positive refractive power has a concave object-side surface 341 and a convex image-side surface 342, and is made of plastic material. The object-side surface 341 and the mage-side surface 342 of the fourth lens element 340 are aspheric.

The fifth lens element 350 with negative refractive power has a convex object-side surface 351 and a concave image-side surface 352, and is made of plastic material. The object-side surface 351 and the image-side surface 352 of the fifth lens element 350 are aspheric. Furthermore, the fifth lens element 350 has inflection points on the object-side surface 351 and the image-side surface 352 thereof.

The IR-cut filter 370 is made of glass, and located between the fifth lens element 350 and the image plane 360, and will not affect the focal length of the optical image lens assembly.

The detailed optical data of the 3rd embodiment are shown in Table 5 and the aspheric surface data are shown in Table 6 below.

TABLE 5

3rd Embodiment
f = 2.81 mm, Fno = 2.54, HFOV = 44.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.010 | | | | |
| 2 | Lens 1 | 4.725 (ASP) | 0.630 | Plastic | 1.530 | 55.8 | 2.43 |
| 3 | | −1.687 (ASP) | 0.218 | | | | |
| 4 | Lens 2 | −2.482 (ASP) | 0.220 | Plastic | 1.633 | 23.4 | −10.08 |
| 5 | | −4.202 (ASP) | 0.237 | | | | |
| 6 | Lens 3 | −1.329 (ASP) | 0.240 | Plastic | 1.634 | 23.8 | −3.78 |
| 7 | | −3.192 (ASP) | 0.123 | | | | |
| 8 | Lens 4 | −2.461 (ASP) | 0.669 | Plastic | 1.530 | 55.8 | 1.92 |
| 9 | | −0.786 (ASP) | 0.050 | | | | |
| 10 | Lens 5 | 1.390 (ASP) | 0.492 | Plastic | 1.530 | 55.8 | −3.26 |
| 11 | | 0.676 (ASP) | 0.800 | | | | |
| 12 | IR-cut filter | Plano | 0.300 | Glass | 1.517 | 64.2 | — |

TABLE 5-continued

3rd Embodiment
f = 2.81 mm, Fno = 2.54, HFOV = 44.2 deg.

| Surface # | | Curvature Radius | Thickness | Material | Index | Abbe # | Focal length |
|---|---|---|---|---|---|---|---|
| 13 | | Plano | 0.467 | | | | |
| 14 | Image | Plano | — | | | | |

Note:
Reference wavelength (d-line) is 587.6 nm.

TABLE 6

Aspheric Coefficients

| Surface # | | | | | |
|---|---|---|---|---|---|
| | 2 | 3 | 4 | 5 | 6 |
| k = | −4.7222E+01 | −5.2317E+00 | −7.3095E+00 | −1.0288E+01 | −4.1511E+00 |
| A4 = | −9.1491E−02 | −3.4475E−01 | −3.1781E−01 | −8.7136E−02 | −7.1509E−02 |
| A6 = | −1.0310E−01 | −1.7612E−01 | −3.5335E−01 | −4.6458E−01 | −8.4249E−02 |
| A8 = | −4.4794E−01 | 5.7201E−01 | 9.4191E−01 | 5.4557E−01 | −1.3308E−01 |
| A10 = | 9.4851E−02 | −4.8997E−01 | −1.2167E+00 | −5.3759E−01 | 4.5317E−01 |
| A12 = | 3.3207E−02 | −2.9450E−01 | 1.2851E+00 | 2.1950E−01 | −2.5228E−01 |
| A14 = | −7.8812E−02 | 1.4813E−01 | −3.2518E−01 | 1.7400E−01 | |

| Surface # | | | | | |
|---|---|---|---|---|---|
| | 7 | 8 | 9 | 10 | 11 |
| k = | −3.3352E+00 | 2.7004E+00 | −3.0485E+00 | −4.3265E+00 | −3.5473E+00 |
| A4 = | 5.0232E−02 | 8.8368E−02 | −2.1336E−01 | −6.0495E−02 | −6.9053E−02 |
| A6 = | −9.2001E−02 | 1.0748E−01 | 2.3607E−01 | 1.1312E−02 | 2.6861E−02 |
| A8 = | 1.3509E−01 | −2.5023E−01 | −1.5569E−01 | −2.8266E−04 | −8.7578E−03 |
| A10 = | −4.7514E−02 | 2.6683E−01 | 6.3894E−02 | −6.1372E−05 | 1.8668E−03 |
| A12 = | −7.9666E−03 | −1.3450E−01 | 1.3663E−03 | −5.0655E−05 | −2.2425E−04 |
| A14 = | | 3.1304E−02 | −3.2549E−03 | 8.7706E−06 | 1.1087E−05 |

In the optical image lens assembly according to the 3rd embodiment, the definitions of f, Fno, FOV, V1, V2, V3, R1, R2, R3, R4, R5, R6, R9, f2, T12 T23, T34, T45 and TD are the same as those stated in the 1st embodiment with corresponding values for the 3rd embodiment. Moreover, these parameters can be calculated from Table 5 and Table 6 as the following values and satisfy the following relationships:

| f (mm) | 2.81 | R5/R4 | 0.32 |
|---|---|---|---|
| Fno | 2.54 | R9/f | 0.50 |
| HFOV (deg.) | 44.2 | (T34/R6) × 100 | −3.85 |
| (V2 + V3)/V1 | 0.85 | (T34 + T45)/(T12 + T23) | 0.38 |
| R2/R1 | −0.36 | f/f2 | −0.28 |
| (R3 − R4)/(R3 + R4) | −0.26 | TD (mm) | 2.88 |

4th Embodiment

Figure 7:
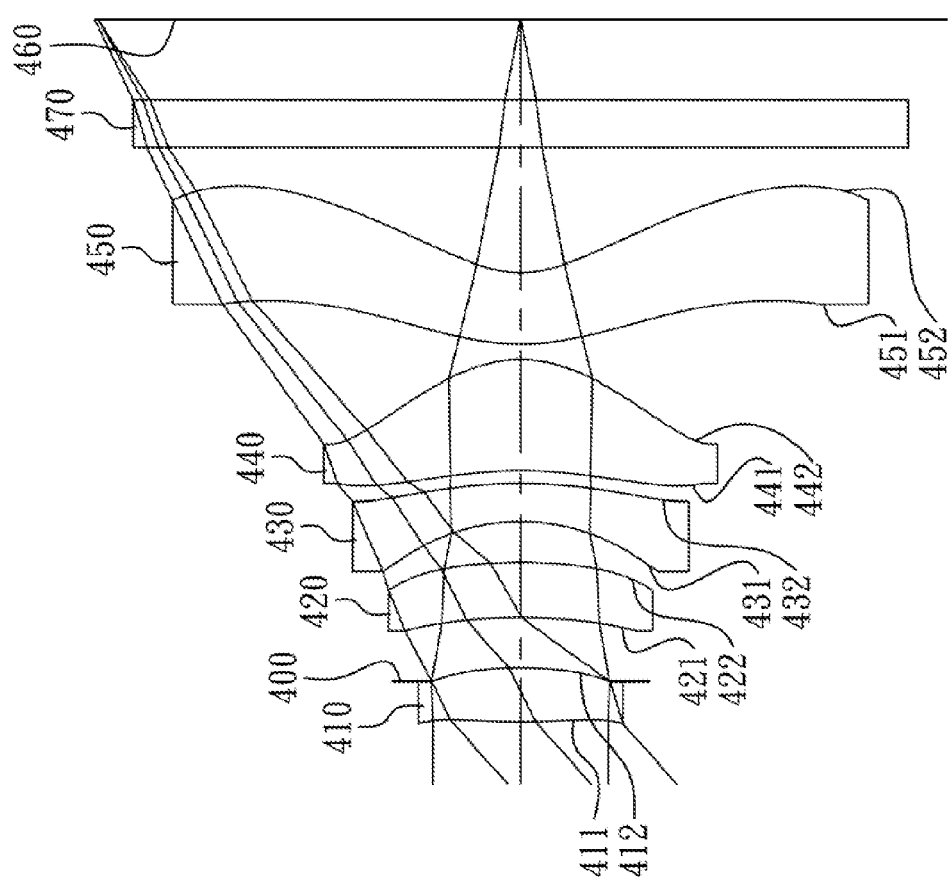
FIG. 7 is a schematic view of an optical image lens assembly according to the 4th embodiment of the present disclosure.
Figure 8:
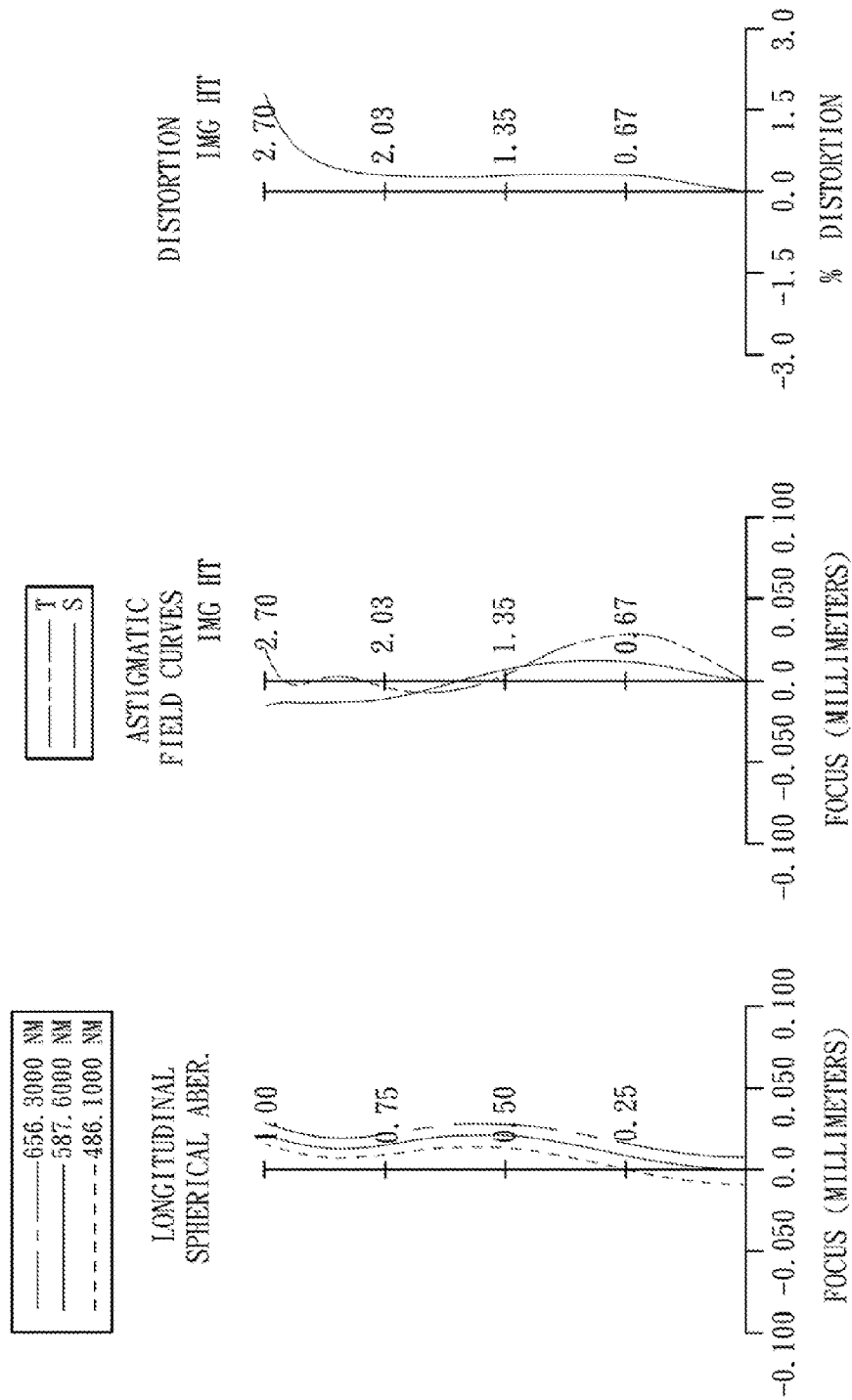
FIG. 8 shows spherical aberration curves, astigmatic field curves and a distortion curve of the optical image lens assembly according to the 4th embodiment.

FIG. 7 is a schematic view of an optical image lens assembly according to the 4th embodiment of the present disclosure. FIG. 8 shows spherical aberration curves, astigmatic field curves and a distortion curve of the optical image lens assembly according to the 4th embodiment. In FIG. 7, the optical image lens assembly includes, in order from an object side to an image side, the first lens element 410, an aperture stop 400, the second lens element 420, the third lens element 430, the fourth lens element 440, the fifth lens element 450, an IR-cut filter 470 and an image plane 460.

The first lens element 410 with positive refractive power has a convex object-side surface 411 and a convex image-side surface 412, and is made of plastic material. The object-side surface 411 and the image-side surface 412 of the first lens element 410 are aspheric. Furthermore, the first lens element 410 has inflection points on the object-side surface 411 thereof.

The second lens element 420 with positive refractive power has a concave object-side surface 421 and a convex image-side surface 422, and is made of plastic material. The object-side surface 421 and the image-side surface 422 of the second lens element 420 are aspheric.

The third lens element 430 with negative refractive power has a concave object-side surface 431 and a convex image-side surface 432, and is made of plastic material. The object-side surface 431 and the image-side surface 432 of the third lens element 430 are aspheric.

The fourth lens element 440 with positive refractive power has a concave object-side surface 441 and a convex image-side surface 442, and is made of plastic material. The object-side surface 441 and the mage-side surface 442 of the fourth lens element 440 are aspheric.

The fifth lens element 450 with negative refractive power has a convex object-side surface 451 and a concave image-side surface 452, and is made of plastic material. The object-side surface 451 and the image-side surface 452 of the fifth lens element 450 are aspheric. Furthermore, the fifth lens element 450 has inflection points on the object-side surface 451 and the image-side surface 452 thereof.

The IR-cut filter 470 is made of glass, and located between the fifth lens element 450 and the image plane 460, and will not affect the focal length of the optical image lens assembly.

The detailed optical data of the 4th embodiment are shown in Table 7 and the aspheric surface data are shown in Table 8 below.

TABLE 7

4th Embodiment
f = 2.97 mm, Fno = 2.65, HFOV = 41.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 5.166 (ASP) | 0.344 | Plastic | 1.530 | 55.8 | 3.30 |
| 2 | | −2.583 (ASP) | −0.085 | | | | |
| 3 | Ape. Stop | Plano | 0.409 | | | | |
| 4 | Lens 2 | −3.747 (ASP) | 0.351 | Plastic | 1.614 | 25.6 | 19.15 |
| 5 | | −2.943 (ASP) | 0.264 | | | | |
| 6 | Lens 3 | −1.296 (ASP) | 0.240 | Plastic | 1.650 | 21.4 | −3.47 |
| 7 | | −3.277 (ASP) | 0.083 | | | | |
| 8 | Lens 4 | −2.683 (ASP) | 0.710 | Plastic | 1.530 | 55.8 | 1.88 |
| 9 | | −0.792 (ASP) | 0.099 | | | | |
| 10 | Lens 5 | 1.503 (ASP) | 0.460 | Plastic | 1.530 | 55.8 | −2.91 |
| 11 | | 0.680 (ASP) | 0.800 | | | | |
| 12 | IR-cut filter | Plano | 0.300 | Glass | 1.517 | 64.2 | — |
| 13 | | Plano | 0.516 | | | | |
| 14 | Image | Plano | — | | | | |

Note:
Reference wavelength (d-line) is 587.6 nm.

TABLE 8

Aspheric Coefficients

| | Surface # | | | | |
|---|---|---|---|---|---|
| | 1 | 2 | 4 | 5 | 6 |
| k = | −1.1109E+00 | −1.6801E+01 | −5.0000E+01 | −1.4462E+01 | −3.7187E+00 |
| A4 = | −1.7147E−01 | −2.7682E−01 | −7.5084E−02 | 8.5187E−03 | −1.4089E−01 |
| A6 = | −1.9902E−01 | −1.6967E−01 | −1.6601E−01 | −3.8984E−01 | −1.0592E−01 |
| A8 = | 1.5582E−02 | 3.0343E−01 | 5.3524E−01 | 3.9267E−01 | −9.6012E−02 |
| A10 = | −5.2896E−01 | −4.0272E−01 | −1.1763E+00 | −4.9471E−01 | 4.9354E−01 |
| A12 = | 3.3213E−02 | −2.9449E−01 | 1.2852E+00 | 2.1950E−01 | −2.5228E−01 |
| A14 = | −7.8807E−02 | 1.4814E−01 | −3.2517E−01 | 1.7399E−01 | |

| | Surface # | | | | |
|---|---|---|---|---|---|
| | 7 | 8 | 9 | 10 | 11 |
| k = | −1.0000E+00 | 3.2663E+00 | −3.2874E+00 | −5.2224E+00 | −3.6830E+00 |
| A4 = | 3.6331E−02 | 1.0412E−01 | −2.0656E−01 | −5.3756E−02 | −6.4491E−02 |
| A6 = | −8.6213E−02 | 1.1168E−01 | 2.4135E−01 | 1.0123E−02 | 2.4932E−02 |
| A8 = | 1.4093E−01 | −2.4653E−01 | −1.5405E−01 | −6.8870E−04 | −8.2017E−03 |
| A10 = | −4.3956E−02 | 2.6697E−01 | 6.4141E−02 | −4.2269E−05 | 1.7420E−03 |
| A12 = | −5.5455E−03 | −1.3517E−01 | 1.1474E−03 | −2.6519E−05 | −2.2094E−04 |
| A14 = | | 2.9263E−02 | −4.5556E−03 | 6.3502E−06 | 1.2115E−05 |

In the optical image lens assembly according to the 4th embodiment, the definitions of f, Fno, FOV, V1, V2, V3, R1, R2, R3, R4, R5, R6, R9, f2, T12 T23, T34, T45 and TD are the same as those stated in the 1st embodiment with corresponding values for the 4th embodiment. Moreover, these parameters can be calculated from Table 7 and Table 8 as the following values and satisfy the following relationships:

| f (mm) | 2.97 | R5/R4 | 0.44 |
|---|---|---|---|
| Fno | 2.65 | R9/f | 0.51 |
| HFOV (deg.) | 41.7 | (T34/R6) × 100 | −2.53 |
| (V2 + V3)/V1 | 0.84 | (T34 + T45)/(T12 + T23) | 0.31 |
| R2/R1 | −0.50 | f/f2 | 0.15 |
| (R3 − R4)/(R3 + R4) | 0.12 | TD (mm) | 2.88 |

5th Embodiment

Figure 9:
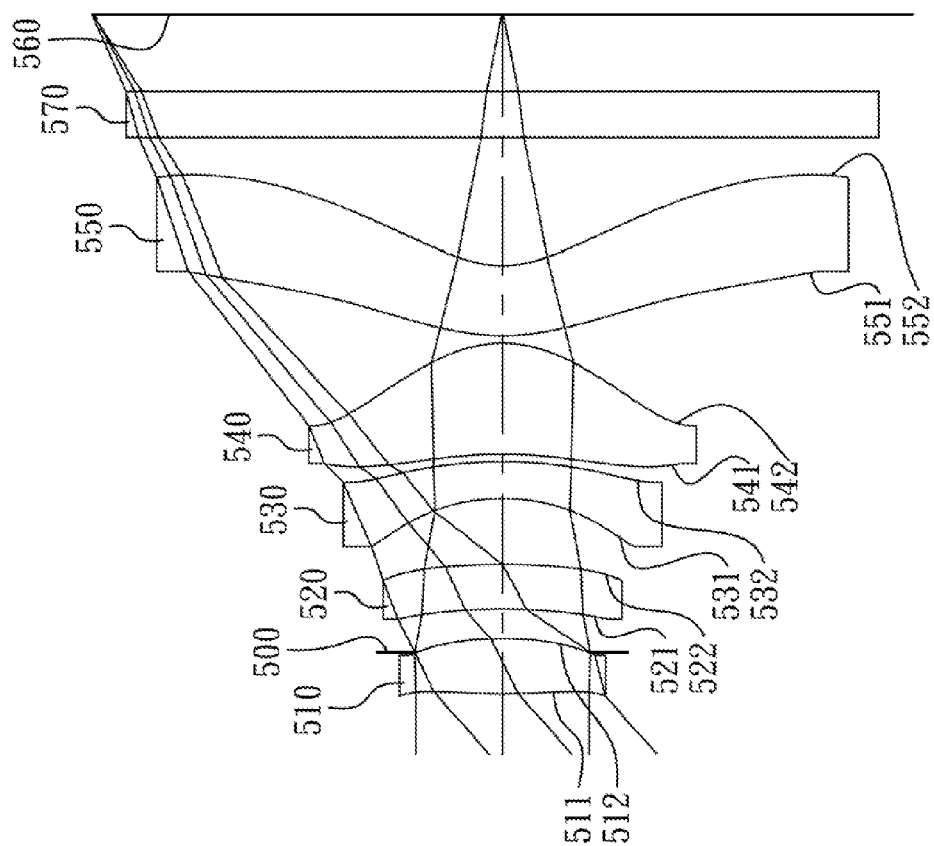
FIG. 9 is a schematic view of an optical image lens assembly according to the 5th embodiment of the present disclosure.
Figure 10:
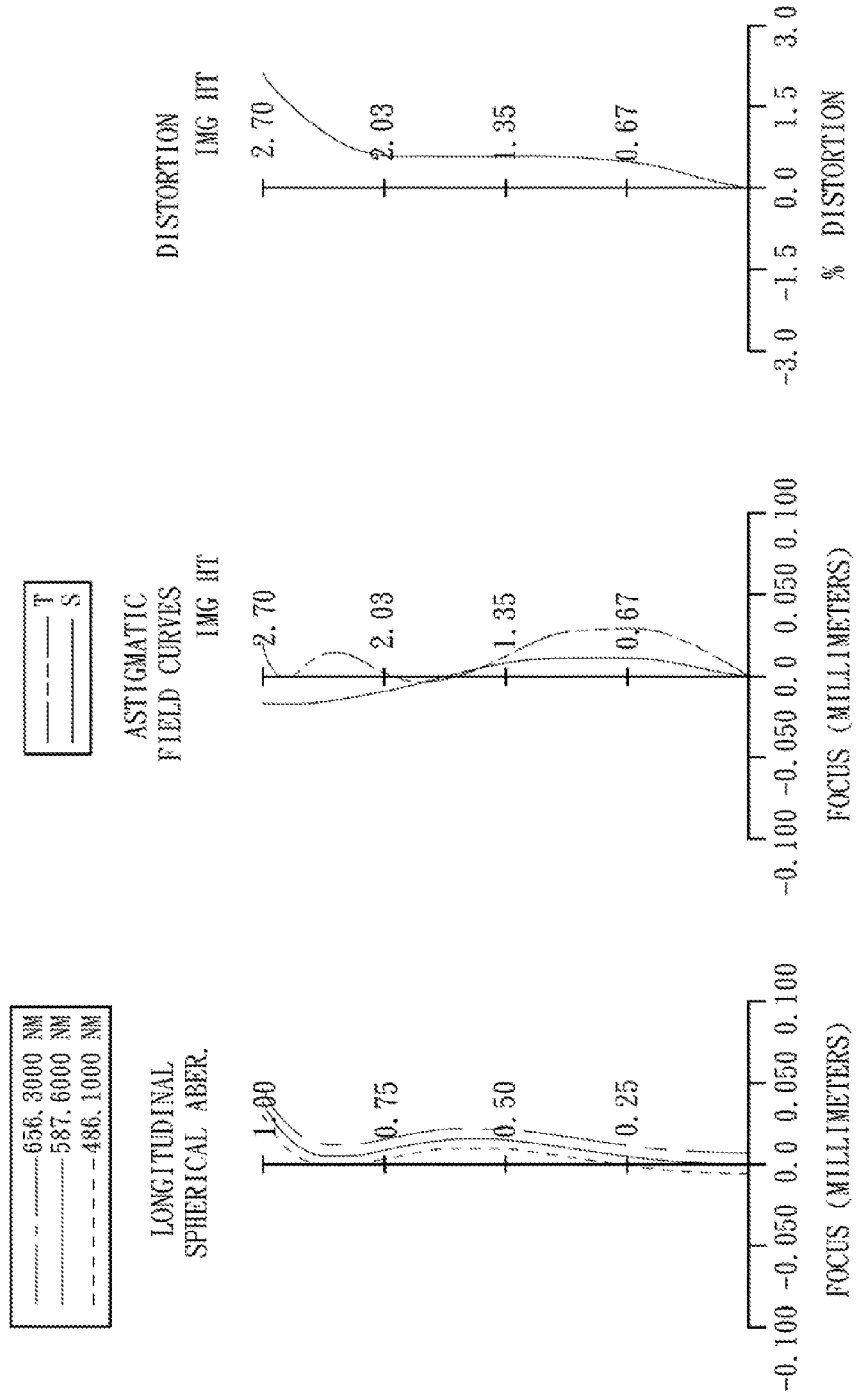
FIG. 10 shows spherical aberration curves, astigmatic field curves and a distortion curve of the optical image lens assembly according to the 5th embodiment.

FIG. 9 is a schematic view of an optical image lens assembly according to the 5th embodiment of the present disclosure. FIG. 10 shows spherical aberration curves, astigmatic field curves and a distortion curve of the optical image lens assembly according to the 5th embodiment. In FIG. 9, the optical image lens assembly includes, in order from an object side to an image side, the first lens element 510, an aperture stop 500, the second lens element 520, the third lens element 530, the fourth lens element 540, the fifth lens element 550, an IR-cut filter 570 and an image plane 560.

The first lens element 510 with positive refractive power has a convex object-side surface 511 and a convex image-side surface 512, and is made of glass material. The object-side surface 511 and the image-side surface 512 of the first lens element 510 are aspheric. Furthermore, the first lens element 510 has inflection points on the object-side surface 511 thereof.

The second lens element 520 with negative refractive power has a concave object-side surface 521 and a convex image-side surface 522, and is made of plastic material. The object-side surface 521 and the image-side surface 522 of the second lens element 520 are aspheric.

The third lens element 530 with negative refractive power has a concave object-side surface 531 and a convex image-side surface 532, and is made of plastic material. The object-side surface 531 and the image-side surface 532 of the third lens element 530 are aspheric.

The fourth lens element 540 with positive refractive power has a concave object-side surface 541 and a convex image-side surface 542, and is made of plastic material. The object-side surface 541 and the mage-image-side surface 542 of the fourth lens element 540 are aspheric.

The fifth lens element 550 with negative refractive power has a convex object-side surface 551 and a concave image-side surface 552, and is made of plastic material. The object-side surface 551 and the image-side surface 552 of the fifth lens element 550 are aspheric. Furthermore, the fifth lens element 550 has inflection points on the object-side surface 551 and the image-side surface 552 thereof.

The IR-cut filter 570 is made of glass, and located between the fifth lens element 550 and the image plane 560, and will not affect the focal length of the optical image lens assembly.

The detailed optical data of the 5th embodiment are shown in Table 9 and the aspheric surface data are shown in Table 10 below.

TABLE 9

5th Embodiment
f = 2.97 mm, Fno = 2.60, HFOV = 41.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 4.672 (ASP) | 0.365 | Glass | 1.523 | 51.5 | 2.93 |
| 2 | | −2.225 (ASP) | −0.090 | | | | |
| 3 | Ape. Stop | Plano | 0.289 | | | | |
| 4 | Lens 2 | −3.357 (ASP) | 0.291 | Plastic | 1.650 | 21.4 | −28.88 |
| 5 | | −4.228 (ASP) | 0.439 | | | | |
| 6 | Lens 3 | −1.323 (ASP) | 0.240 | Plastic | 1.650 | 21.4 | −3.89 |
| 7 | | −2.980 (ASP) | 0.050 | | | | |
| 8 | Lens 4 | −2.780 (ASP) | 0.733 | Plastic | 1.530 | 55.8 | 1.84 |
| 9 | | −0.788 (ASP) | 0.050 | | | | |
| 10 | Lens 5 | 1.470 (ASP) | 0.465 | Plastic | 1.530 | 55.8 | −2.99 |
| 11 | | 0.679 (ASP) | 0.850 | | | | |
| 12 | IR-cut filter | Plano | 0.300 | Glass | 1.517 | 64.2 | — |
| 13 | | Plano | 0.509 | | | | |
| 14 | Image | Plano | — | | | | |

Note:
Reference wavelength (d-line) is 587.6 nm.

TABLE 10

Aspheric Coefficients

| | Surface # | | | | |
|---|---|---|---|---|---|
| | 1 | 2 | 4 | 5 | 6 |
| k = | −4.2144E+00 | −1.4068E+01 | −5.0000E+01 | −4.3988E+01 | −2.6397E+00 |
| A4 = | −1.5887E−01 | −2.4934E−01 | 6.0626E−03 | 3.1060E−02 | −1.7078E−01 |
| A6 = | −2.0888E−01 | −9.5908E−02 | −2.3276E−01 | −3.6882E−01 | −9.7194E−02 |
| A8 = | 9.1934E−02 | −1.4951E−01 | 4.0814E−01 | 3.4261E−01 | −3.4457E−02 |
| A10 = | −6.7001E−01 | 2.2085E−01 | −1.0164E+00 | −4.5607E−01 | 5.0041E−01 |
| A12 = | 3.5259E−02 | −2.9449E−01 | 1.2848E+00 | 2.1951E−01 | −2.5229E−01 |
| A14 = | −7.8807E−02 | 1.4814E−01 | −3.2624E−01 | 1.7411E−01 | |

| | Surface # | | | | |
|---|---|---|---|---|---|
| | 7 | 8 | 9 | 10 | 11 |
| k = | −1.0000E+00 | 3.6416E+00 | −3.3502E+00 | −4.8133E+00 | −3.7110E+00 |
| A4 = | 6.7403E−03 | 1.0832E−01 | −2.1432E−01 | −5.0164E−02 | −6.1378E−02 |
| A6 = | −8.2238E−02 | 1.1441E−01 | 2.4620E−01 | 1.0477E−02 | 2.4212E−02 |
| A8 = | 1.5113E−01 | −2.4471E−01 | −1.5140E−01 | −3.9182E−04 | −8.0109E−03 |
| A10 = | −3.5488E−02 | 2.6695E−01 | 6.4677E−02 | −1.0055E−05 | 1.7591E−03 |
| A12 = | −6.3227E−03 | −1.3626E−01 | 7.3531E−04 | −2.7319E−05 | −2.1551E−04 |
| A14 = | | 2.8667E−02 | −5.4792E−03 | 3.6627E−06 | 1.0838E−05 |

In the optical image lens assembly according to the 5th embodiment, the definitions of f, Fno, FOV, V1, V2, V3, R1, R2, R3, R4, R5, R6, R9, f2, T12, T23, T34, T45 and TD are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f (mm) | 2.97 | R5/R4 | 0.31 |
| Fno | 2.60 | R9/f | 0.49 |
| HFOV (deg.) | 41.6 | (T34/R6) × 100 | −1.68 |
| (V2 + V3)/V1 | 0.83 | (T34 + T45)/(T12 + T23) | 0.16 |
| R2/R1 | −0.48 | f/f2 | −0.10 |
| (R3 − R4)/(R3 + R4) | −0.11 | TD (mm) | 2.83 |

6th Embodiment

Figure 11:
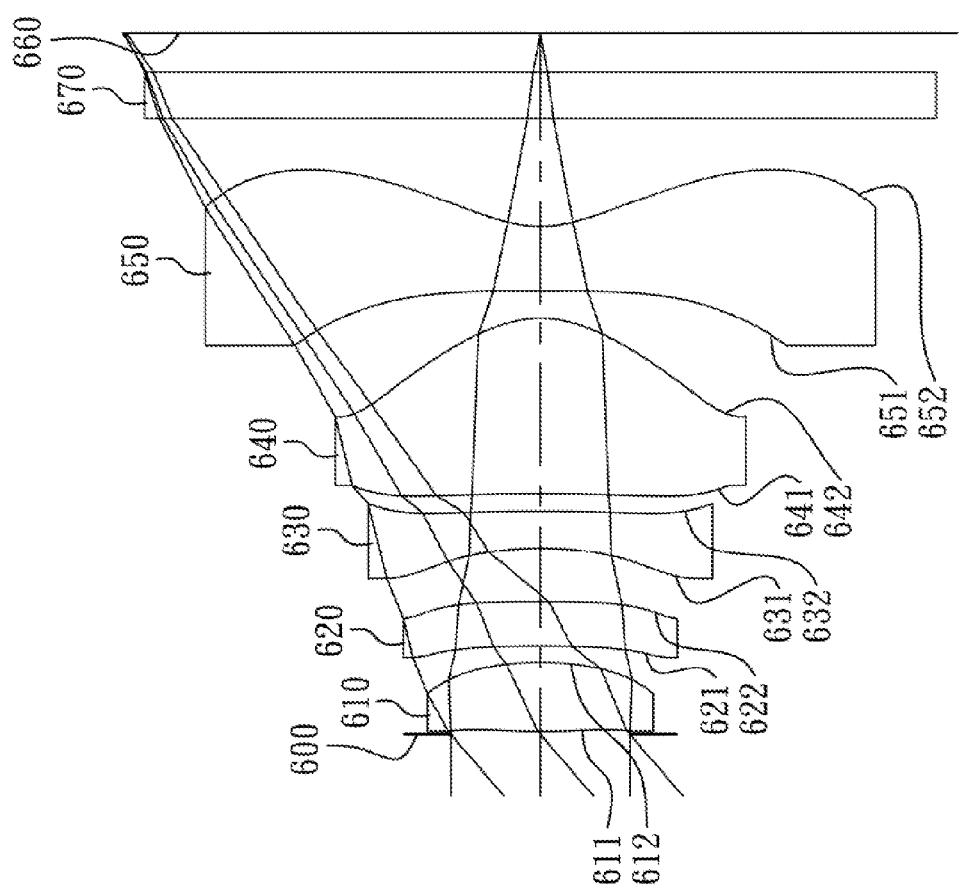
FIG. 11 is a schematic view of an optical image lens assembly according to the 6th embodiment of the present disclosure.
Figure 12:
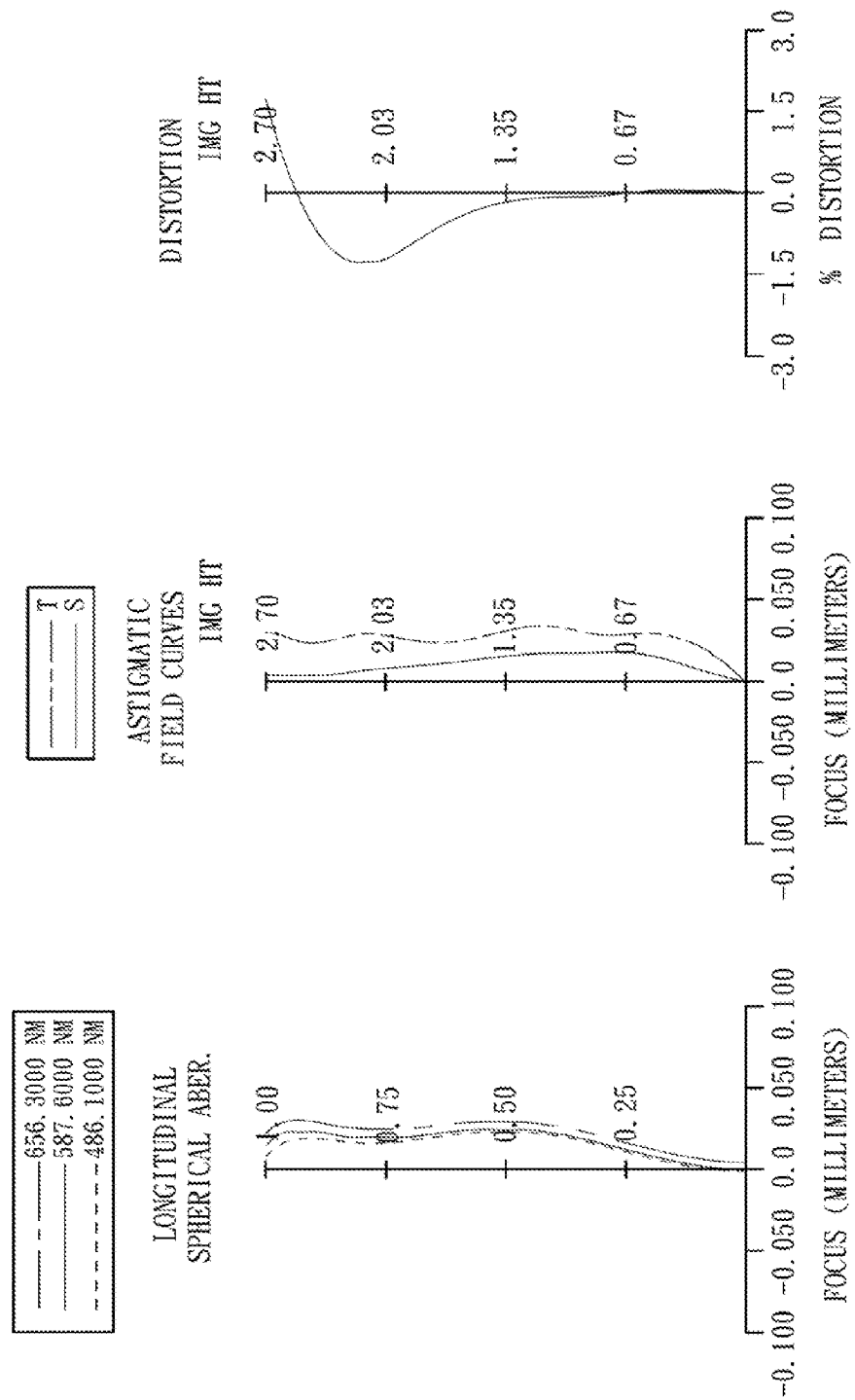
FIG. 12 shows spherical aberration curves, astigmatic field curves and a distortion curve of the optical image lens assembly according to the 6th embodiment.

FIG. 11 is a schematic view of an optical image lens assembly according to the 6th embodiment of the present disclosure. FIG. 12 shows spherical aberration curves, astigmatic field curves and a distortion curve of the optical image lens assembly according to the 6th embodiment. In FIG. 11, the optical image lens assembly includes, in order from an object side to an image side, an aperture stop 600, the first lens element 610, the second lens element 620, the third lens element 630, the fourth lens element 640, the fifth lens element 650, an IR-cut filter 670 and an image plane 660.

The first lens element 610 with positive refractive power has a convex object-side surface 611 and a convex image-side surface 612, and is made of plastic material. The object-side surface 611 and the image-side surface 612 of the first lens element 610 are aspheric. Furthermore, the first lens element 610 has inflection points on the object-side surface 611 thereof.

The second lens element 620 with negative refractive power has a concave object-side surface 621 and a convex image-side surface 622, and is made of plastic material. The object-side surface 621 and the image-side surface 622 of the second lens element 620 are aspheric.

The third lens element 630 with negative refractive power has a concave object-side surface 631 and a convex image-side surface 632, and is made of plastic material. The object-side surface 631 and the image-side surface 632 of the third lens element 630 are aspheric.

The fourth lens element 640 with positive refractive power has a concave object-side surface 641 and a convex image-side surface 642, and is made of plastic material. The object-side surface 641 and the mage-side surface 642 of the fourth lens element 640 are aspheric.

The fifth lens element 650 with negative refractive power has a concave object-side surface 651 and a concave image-side surface 652, and is made of plastic material. The object-side surface 651 and the image-side surface 652 of the fifth lens element 650 are aspheric. Furthermore, the fifth lens element 650 has inflection points on the image-side surface 652 thereof.

The IR-cut filter 670 is made of glass, and located between the fifth lens element 650 and the image plane 660, and will not affect the focal length of the optical image lens assembly.

The detailed optical data of the 6th embodiment are shown in Table 11 and the aspheric surface data are shown in Table 12 below.

TABLE 11

6th Embodiment
f = 3.08 mm, Fno = 2.66, HFOV = 40.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.020 | | | | |
| 2 | Lens 1 | 5.974 (ASP) | 0.448 | Plastic | 1.535 | 56.3 | 2.77 |
| 3 | | −1.914 (ASP) | 0.107 | | | | |
| 4 | Lens 2 | −9.517 (ASP) | 0.283 | Plastic | 1.650 | 21.4 | −33.33 |
| 5 | | −17.180 (ASP) | 0.348 | | | | |
| 6 | Lens 3 | −2.338 (ASP) | 0.240 | Plastic | 1.650 | 21.4 | −4.38 |
| 7 | | −13.630 (ASP) | 0.110 | | | | |
| 8 | Lens 4 | −15.553 (ASP) | 1.138 | Plastic | 1.514 | 56.8 | 1.36 |
| 9 | | −0.684 (ASP) | 0.178 | | | | |
| 10 | Lens 5 | −67.567 (ASP) | 0.414 | Plastic | 1.535 | 56.3 | −1.30 |
| 11 | | 0.703 (ASP) | 0.700 | | | | |
| 12 | IR-cut filter | Plano | 0.300 | Glass | 1.517 | 64.2 | — |
| 13 | | Plano | 0.254 | | | | |
| 14 | Image | Plano | — | | | | |

Note:
Reference wavelength (d-line) is 587.6 nm.

TABLE 12

Aspheric Coefficients

| | Surface # | | | | |
|---|---|---|---|---|---|
| | 2 | 3 | 4 | 5 | 6 |
| k = | −4.1759E+01 | −1.3712E+01 | −3.4318E+01 | −1.0000E+00 | −9.5988E+00 |
| A4 = | −1.3075E−01 | −3.0790E−01 | −1.0239E−02 | −7.4380E−02 | −1.4354E−01 |
| A6 = | −1.3034E−01 | −1.0666E−01 | −4.1099E−01 | −3.4313E−01 | −7.2286E−02 |
| A8 = | −2.0610E−01 | 1.9409E−01 | 5.8749E−01 | 3.6668E−01 | 3.8259E−02 |

TABLE 12-continued

Aspheric Coefficients

| A10 = | −2.3026E−01 | −2.3853E−01 | −9.5456E−01 | −3.2468E−01 | 3.9653E−01 |
|---|---|---|---|---|---|
| A12 = | 3.5256E−02 | −2.9449E−01 | 1.2848E+00 | 2.1951E−01 | −2.5128E−01 |
| A14 = | −7.8809E−02 | 1.4814E−01 | −3.2624E−01 | 1.7411E−01 | |

| | Surface # | | | | |
|---|---|---|---|---|---|
| | 7 | 8 | 9 | 10 | 11 |
| k = | −9.7364E+00 | −3.4086E+00 | −3.5033E+00 | −5.0000E+01 | −5.1537E+00 |
| A4 = | 2.6119E−02 | −1.9039E−02 | −1.9340E−01 | −7.1273E−02 | −7.4867E−02 |
| A6 = | −6.8925E−01 | 1.2546E−01 | 2.1955E−01 | 5.5718E−03 | 2.8479E−02 |
| A8 = | 1.4874E−01 | −2.3689E−01 | −1.6249E−01 | −9.0045E−04 | −9.3437E−03 |
| A10 = | −4.6764E−02 | 2.6811E−01 | 6.2950E−02 | 1.2268E−03 | 1.7506E−03 |
| A12 = | −8.7201E−03 | −1.3433E−01 | 1.8491E−03 | 1.4068E−04 | −1.7093E−04 |
| A14 = | | 2.4442E−02 | −3.4449E−03 | −1.5125E−04 | 5.9240E−06 |

In the optical image lens assembly according to the 6th embodiment, the definitions of f, Fno, FOV, V1, V2, V3, R1, R2, R3, R4, R5, R6, R9, f2, T12, T23, T34, T45 and TD are the same as those stated in the 1st embodiment with corresponding values for the 6th embodiment. Moreover, these parameters can be calculated from Table 11 and Table 12 as the following values and satisfy the following relationships:

| f (mm) | 3.08 | R5/R4 | 0.14 |
|---|---|---|---|
| Fno | 2.66 | R9/f | −21.94 |
| HFOV (deg.) | 40.6 | (T34/R6) × 100 | −0.81 |
| (V2 + V3)/V1 | 0.76 | (T34 + T45)/(T12 + T23) | 0.63 |
| R2/R1 | −0.32 | f/f2 | −0.09 |
| (R3 − R4)/(R3 + R4) | −0.29 | TD (mm) | 3.27 |

7th Embodiment

Figure 13:
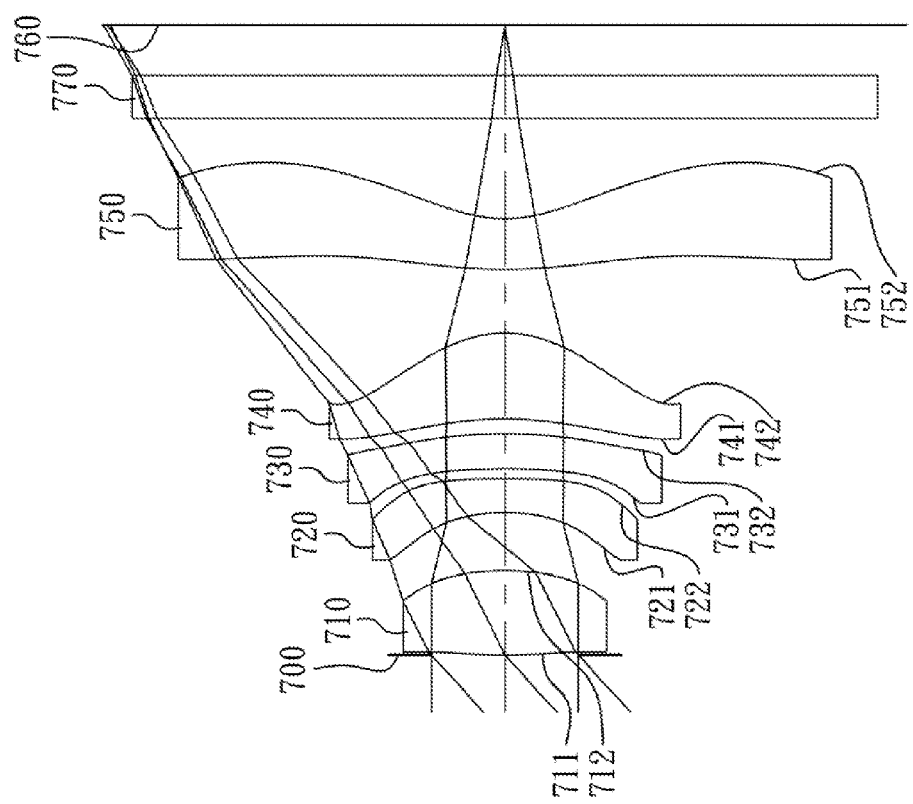
FIG. 13 is a schematic view of an optical image lens assembly according to the 7th embodiment of the present disclosure.
Figure 14:
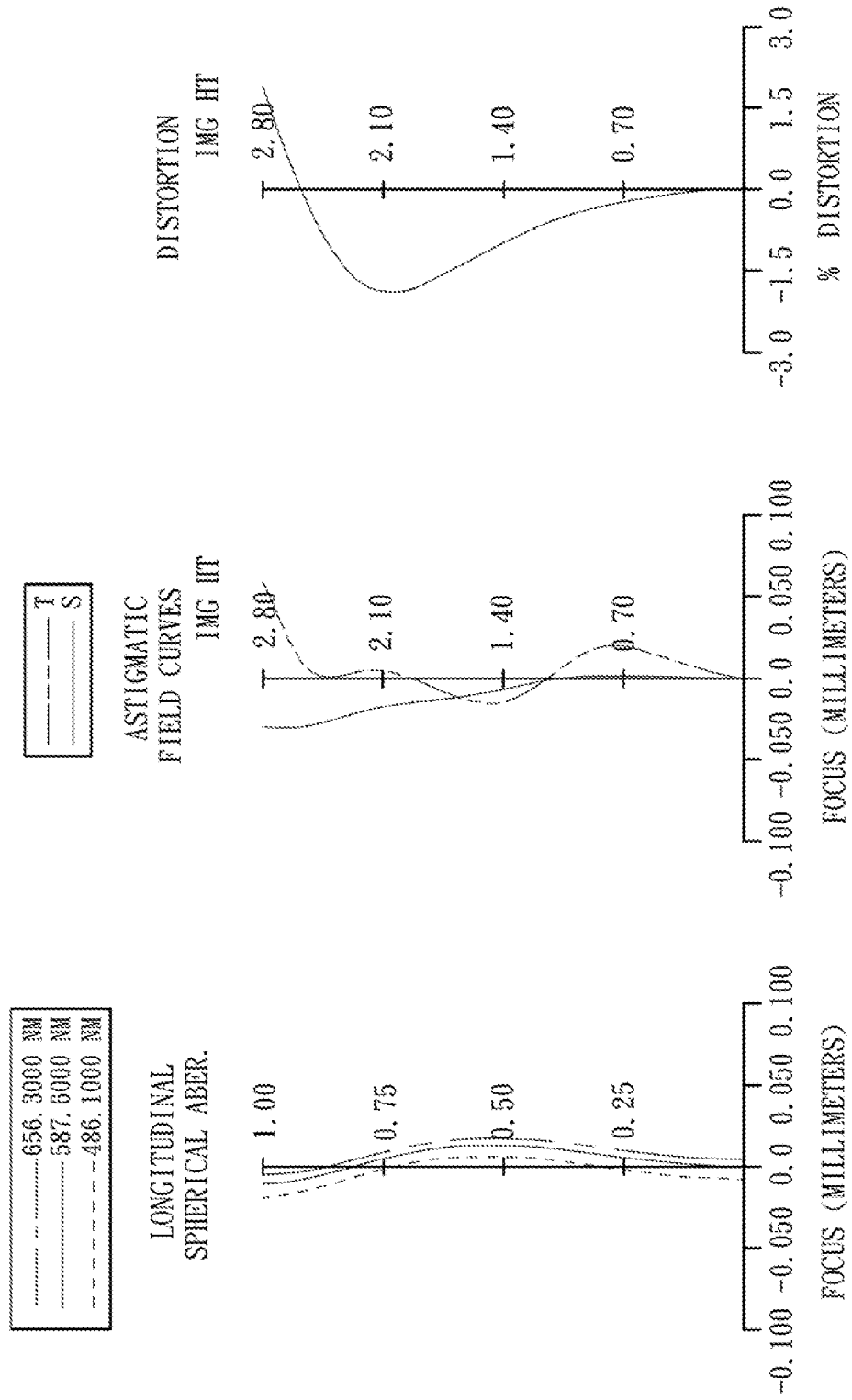
FIG. 14 shows spherical aberration curves, astigmatic field curves and a distortion curve of the optical image lens assembly according to the 7th embodiment.

FIG. 13 is a schematic view of an optical image lens assembly according to the 7th embodiment of the present disclosure. FIG. 14 shows spherical aberration curves, astigmatic field curves and a distortion curve of the optical image lens assembly according to the 7th embodiment. In FIG. 13, the optical image lens assembly includes, in order from an object side to an image side, an aperture stop 700, the first lens element 710, the second lens element 720, the third lens element 730, the fourth lens element 740, the fifth lens element 750, an IR-cut filter 770 and an image plane 760.

The first lens element 710 with positive refractive power has a convex object-side surface 711 and a convex image-side surface 712, and is made of plastic material. The object-side surface 711 and the image-side surface 712 of the first lens element 710 are aspheric. Furthermore, the first lens element 710 has inflection points on the object-side surface 711 thereof.

The second lens element 720 with negative refractive power has a concave object-side surface 721 and a convex image-side surface 722, and is made of plastic material. The object-side surface 721 and the image-side surface 722 of the second lens element 720 are aspheric.

The third lens element 730 with positive refractive power has a concave object-side surface 731 and a convex image-side surface 732, and is made of plastic material. The object-side surface 731 and the image-side surface 732 of the third lens element 730 are aspheric.

The fourth lens element 740 with positive refractive power has a concave object-side surface 741 and a convex image-side surface 742, and is made of plastic material. The object-side surface 741 and the mage-side surface 742 of the fourth lens element 740 are aspheric.

The fifth lens element 750 with negative refractive power has a convex object-side surface 751 and a concave image-side surface 752, and is made of plastic material. The object-side surface 751 and the image-side surface 752 of the fifth lens element 750 are aspheric. Furthermore, the fifth lens element 750 has inflection points on the object-side surface 751 and the image-side surface 752 thereof.

The IR-cut filter 770 is made of glass, and located between the fifth lens element 750 and the image plane 760, and will not affect the focal length of the optical image lens assembly.

The detailed optical data of the 7th embodiment are shown in Table 13 and the aspheric surface data are shown in Table 14 below.

TABLE 13

7th Embodiment
f = 3.02 mm, Fno = 2.95, HFOV = 42.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.000 | | | | |
| 2 | Lens 1 | 3.702 (ASP) | 0.590 | Plastic | 1.535 | 56.3 | 2.45 |
| 3 | | −1.919 (ASP) | 0.404 | | | | |
| 4 | Lens 2 | −1.386 (ASP) | 0.240 | Plastic | 1.633 | 23.4 | −2.69 |
| 5 | | −8.025 (ASP) | 0.070 | | | | |
| 6 | Lens 3 | −4.290 (ASP) | 0.240 | Plastic | 1.650 | 21.4 | 23.05 |
| 7 | | −3.408 (ASP) | 0.104 | | | | |
| 8 | Lens 4 | −2.328 (ASP) | 0.600 | Plastic | 1.535 | 56.3 | 1.95 |
| 9 | | −0.785 (ASP) | 0.447 | | | | |
| 10 | Lens 5 | 3.476 (ASP) | 0.350 | Plastic | 1.535 | 56.3 | −2.45 |
| 11 | | 0.916 (ASP) | 0.700 | | | | |

TABLE 13-continued

7th Embodiment
f = 3.02 mm, Fno = 2.95, HFOV = 42.3 deg.

| Surface # | | Curvature Radius | Thickness | Material | Index | Abbe # | Focal length |
|---|---|---|---|---|---|---|---|
| 12 | IR-cut filter | Plano | 0.300 | Glass | 1.517 | 64.2 | — |
| 13 | | Plano | 0.353 | | | | |
| 14 | Image | Plano | — | | | | |

Note:
Reference wavelength (d-line) is 587.6 nm.

TABLE 14

Aspheric Coefficients

| Surface # | | | | | |
|---|---|---|---|---|---|
| | 2 | 3 | 4 | 5 | 6 |
| k = | −3.4783E+01 | −5.2423E+00 | −1.2833E+00 | −1.2922E+01 | −5.0000E+01 |
| A4 = | −6.5018E−02 | −3.2485E−01 | −4.2437E−01 | −1.4292E−01 | −7.5976E−02 |
| A6 = | −2.5112E−01 | −1.3937E−01 | −1.8300E−01 | −4.6335E−01 | −1.6007E−01 |
| A8 = | −2.3628E−02 | 1.7555E−01 | 1.1049E+00 | 5.4690E−01 | −1.9064E−01 |
| A10 = | −6.6835E−01 | −1.1420E−01 | −1.3283E+00 | −6.1590E−01 | 4.2981E−01 |
| A12 = | 3.3207E−02 | −2.9450E−01 | 1.2851E+00 | 2.1950E−01 | −2.3125E−01 |
| A14 = | −7.8812E−02 | 1.4813E−01 | −3.2518E−01 | 1.7400E−01 | |

| Surface # | | | | | |
|---|---|---|---|---|---|
| | 7 | 8 | 9 | 10 | 11 |
| k = | −1.0449E+00 | 2.4968E+00 | −2.6593E+00 | −3.2353E+00 | −4.4179E+00 |
| A4 = | 1.6108E−02 | 1.1374E−01 | −1.8035E−01 | −6.5796E−02 | −7.1162E−02 |
| A6 = | −7.3457E−02 | 1.0007E−01 | 2.5676E−01 | 1.1605E−02 | 2.7415E−02 |
| A8 = | 1.4422E−01 | −2.4636E−01 | −1.5141E−01 | 1.1083E−04 | −9.1887E−03 |
| A10 = | −4.9659E−02 | 2.7039E−01 | 6.2621E−02 | −3.6823E−05 | 1.9153E−03 |
| A12 = | −1.5769E−02 | −1.3323E−01 | −1.5146E−04 | −5.0643E−05 | −2.0725E−04 |
| A14 = | | 3.0163E−02 | −4.1236E−03 | 6.2244E−06 | 8.7059E−06 |

In the optical image lens assembly according to the 7th embodiment, the definitions of f, Fno, FOV, V1, V2, V3, R1, R2, R3, R4, R5, R6, R9, f2, T12, T23, T34, T45 and TD are the same as those stated in the 1st embodiment with corresponding values for the 7th embodiment. Moreover, these parameters can be calculated from Table 13 and Table 14 as the following values and satisfy the following relationships:

| f (mm) | 3.02 | R5/R4 | 0.53 |
|---|---|---|---|
| Fno | 2.95 | R9/f | 1.15 |
| HFOV (deg.) | 42.3 | (T34/R6) × 100 | −3.05 |
| (V2 + V3)/V1 | 0.80 | (T34 + T45)/(T12 + T23) | 1.16 |
| R2/R1 | −0.52 | f/f2 | −1.12 |
| (R3 − R4)/(R3 + R4) | −0.71 | TD (mm) | 3.05 |

8th Embodiment

Figure 15:
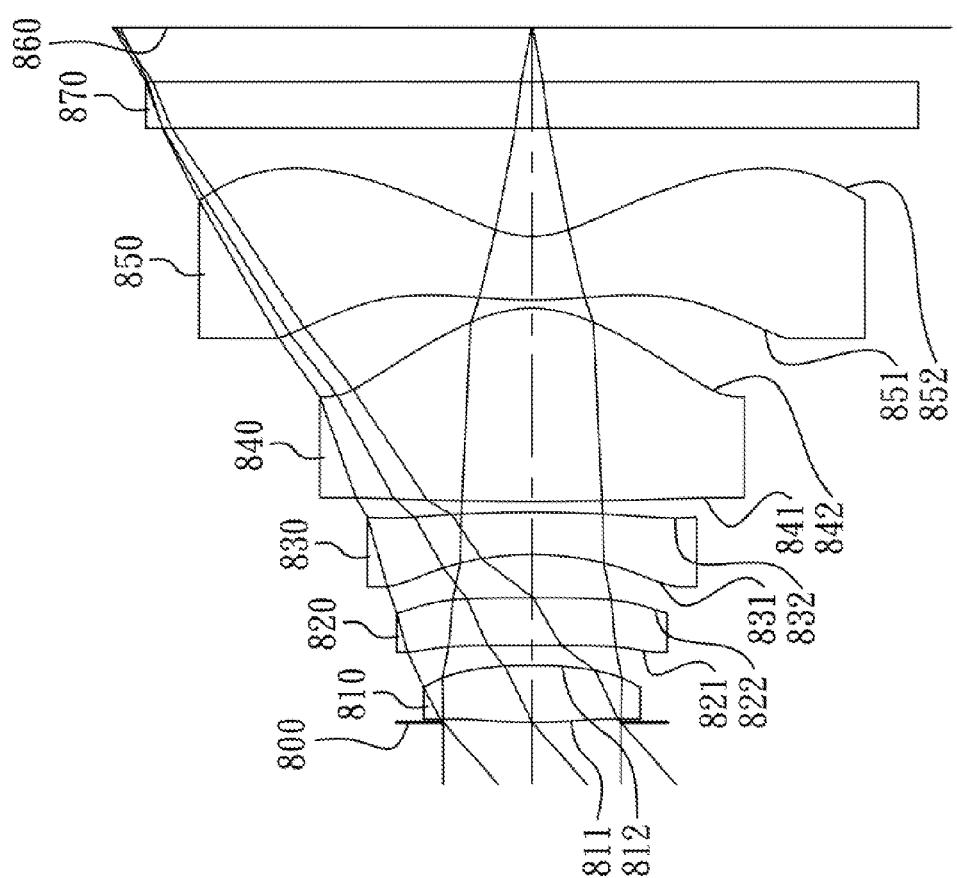
FIG. 15 is a schematic view of an optical image lens assembly according to the 8th embodiment of the present disclosure.
Figure 16:
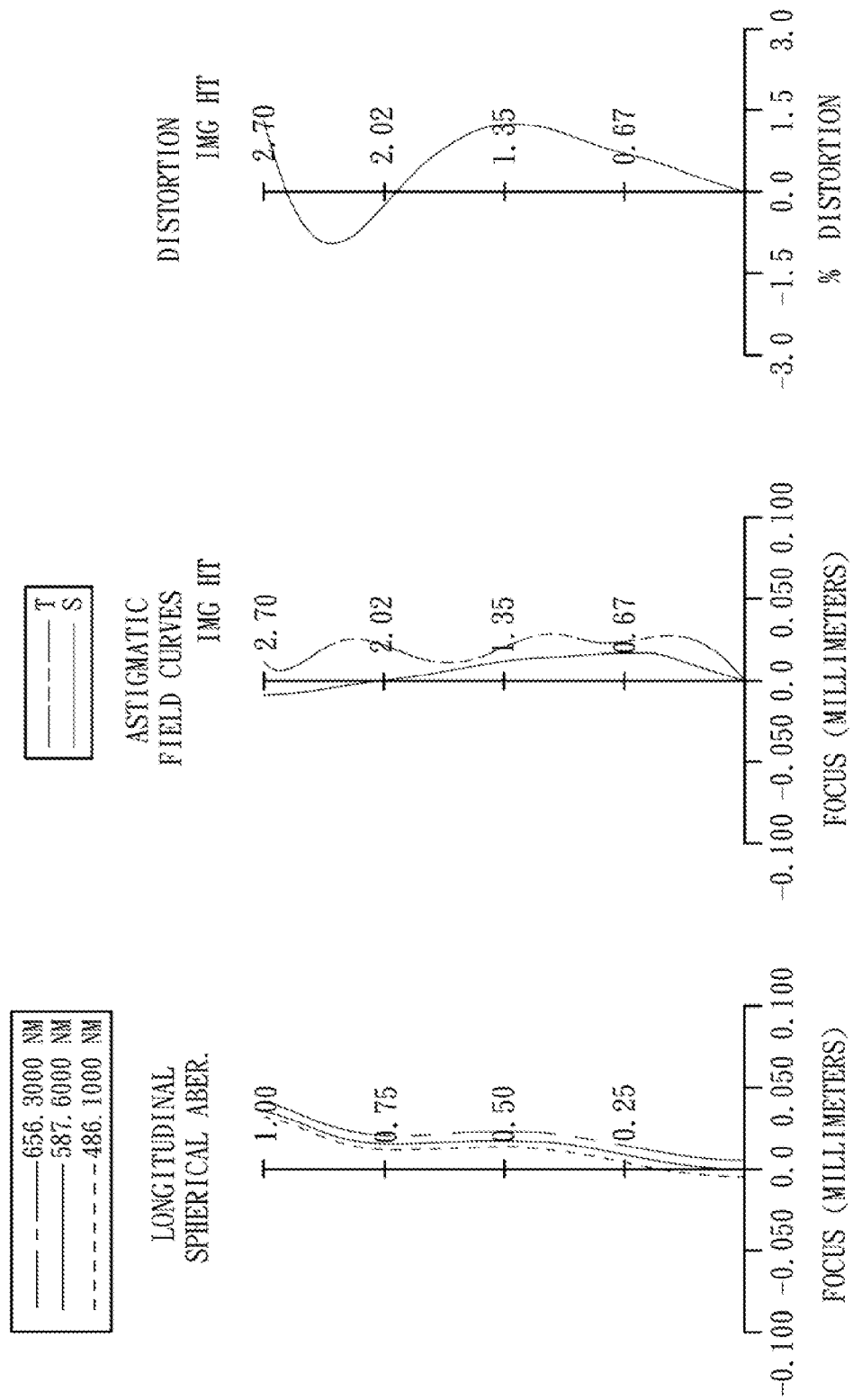
FIG. 16 shows spherical aberration curves, astigmatic field curves and a distortion curve of the optical image lens assembly according to the 8th embodiment.

FIG. 15 is a schematic view of an optical image lens assembly according to the 8th embodiment of the present disclosure. FIG. 16 shows spherical aberration curves, astigmatic field curves and a distortion curve of the optical image lens assembly according to the 8th embodiment. In FIG. 15, the optical image lens assembly includes, in order from an object side to an image side, an aperture stop 800, the first lens element 810, the second lens element 820, the third lens element 830, the fourth lens element 840, the fifth lens element 850, an IR-cut filter 870 and an image plane 860.

The first lens element 810 with positive refractive power has a convex object-side surface 811 and a convex image-side surface 812, and is made of plastic material. The object-side surface 811 and the image-side surface 812 of the first lens element 810 are aspheric. Furthermore, the first lens element 810 has inflection points on the object-side surface 811 thereof.

The second lens element 820 with positive refractive power has a concave object-side surface 821 and a convex image-side surface 822, and is made of plastic material. The object-side surface 821 and the image-side surface 822 of the second lens element 820 are aspheric.

The third lens element 830 with negative refractive power has a concave object-side surface 831 and a convex image-side surface 832, and is made of plastic material. The object-side surface 831 and the image-side surface 832 of the third lens element 830 are aspheric.

The fourth lens element 840 with positive refractive power has a convex object-side surface 841 and a convex image-side surface 842, and is made of plastic material. The object-side surface 841 and the mage-side surface 842 of the fourth lens element 840 are aspheric.

The fifth lens element 850 with negative refractive power has a convex object-side surface 851 and a concave image-side surface 852, and is made of plastic material. The object-side surface 851 and the image-side surface 852 of the fifth lens element 850 are aspheric. Furthermore, the fifth lens element 850 has inflection points on the object-side surface 851 and the image-side surface 852 thereof.

The IR-cut filter 870 is made of glass, and located between the fifth lens element 850 and the image plane 860, and will not affect the focal length of the optical image lens assembly.

The detailed optical data of the 8th embodiment are shown in Table 15 and the aspheric surface data are shown in Table 16 below.

TABLE 15

8th Embodiment
f = 2.98 mm, Fno = 2.60, HFOV = 41.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.001 | | | | |
| 2 | Lens 1 | 3.879 (ASP) | 0.367 | Plastic | 1.530 | 55.8 | 3.24 |
| 3 | | −2.984 (ASP) | 0.133 | | | | |
| 4 | Lens 2 | −63.797 (ASP) | 0.303 | Plastic | 1.543 | 56.5 | 78.34 |
| 5 | | −25.575 (ASP) | 0.279 | | | | |
| 6 | Lens 3 | −2.002 (ASP) | 0.277 | Plastic | 1.650 | 21.4 | −4.03 |
| 7 | | −8.954 (ASP) | 0.065 | | | | |
| 8 | Lens 4 | 16.666 (ASP) | 1.252 | Plastic | 1.530 | 55.8 | 1.31 |
| 9 | | −0.707 (ASP) | 0.053 | | | | |
| 10 | Lens 5 | 2.984 (ASP) | 0.406 | Plastic | 1.530 | 55.8 | −1.35 |
| 11 | | 0.549 (ASP) | 0.700 | | | | |
| 12 | IR-cut filter | Plano | 0.300 | Glass | 1.517 | 64.2 | — |
| 13 | | Plano | 0.349 | | | | |
| 14 | Image | Plano | — | | | | |

Note:
Reference wavelength (d-line) is 587.6 nm.

TABLE 16

Aspheric Coefficients

| | Surface # | | | | |
|---|---|---|---|---|---|
| | 2 | 3 | 4 | 5 | 6 |
| k = | −9.9543E+00 | −3.5407E+01 | −1.0000E+00 | −1.0000E+00 | −1.0778E+01 |
| A4 = | −1.1090E−01 | −2.8149E−01 | −1.6173E−02 | −3.8060E−02 | −1.4829E−01 |
| A6 = | −1.2289E−01 | −1.1049E−01 | −3.7041E−01 | −3.7029E−01 | −7.1130E−02 |
| A8 = | −2.7990E−01 | −1.7027E−02 | 4.6687E−01 | 3.4584E−01 | 4.2995E−01 |
| A10 = | −1.5424E−01 | 6.3791E−03 | −8.2414E−01 | −3.2594E−01 | 3.8608E−01 |
| A12 = | 3.5257E−02 | −2.9449E−01 | 1.2848E+00 | 2.1951E−01 | −2.5229E−01 |
| A14 = | −7.8809E−02 | 1.4813E−01 | −3.2624E−01 | 1.7411E−01 | |

| | Surface # | | | | |
|---|---|---|---|---|---|
| | 7 | 8 | 9 | 10 | 11 |
| k = | −1.0000E+00 | −5.0000E+01 | −4.3741E+00 | −5.0000E+01 | −4.0285E+00 |
| A4 = | 1.4413E−02 | −4.0431E−02 | −1.8709E−01 | −1.1404E−01 | −9.2979E−02 |
| A6 = | −8.1567E−02 | 1.2257E−01 | 2.2694E−01 | 1.3584E−02 | 3.4567E−02 |
| A8 = | 1.3822E−01 | −2.4106E−01 | −1.6312E−01 | 9.8098E−04 | −9.9758E−03 |
| A10 = | −4.7307E−02 | 2.6165E−01 | 6.1139E−02 | 8.7440E−04 | 1.6812E−03 |
| A12 = | −2.6796E−03 | −1.3932E−01 | 1.1308E−03 | 1.1245E−04 | −1.6659E−04 |
| A14 = | | 2.8096E−02 | −3.6028E−03 | −8.8609E−05 | 8.1484E−06 |

In the optical image lens assembly according to the 8th embodiment, the definitions of f, Fno, FOV, V1, V2, V3, R1, R2, R3, R4, R5, R6, R9, f2, T12, T23, T34, T45 and TD are the same as those stated in the 1st embodiment with corresponding values for the 8th embodiment. Moreover, these parameters can be calculated from Table 15 and Table 16 as the following values and satisfy the following relationships:

| f (mm) | 2.98 | R5/R4 | 0.08 |
|---|---|---|---|
| Fno | 2.60 | R9/f | 1.00 |
| HFOV (deg.) | 41.7 | (T34/R6) × 100 | −0.73 |
| (V2 + V3)/V1 | 1.40 | (T34 + T45)/(T12 + T23) | 0.29 |
| R2/R1 | −0.77 | f/f2 | 0.04 |
| (R3 − R4)/(R3 + R4) | 0.43 | TD (mm) | 3.14 |

9th Embodiment

Figure 17:
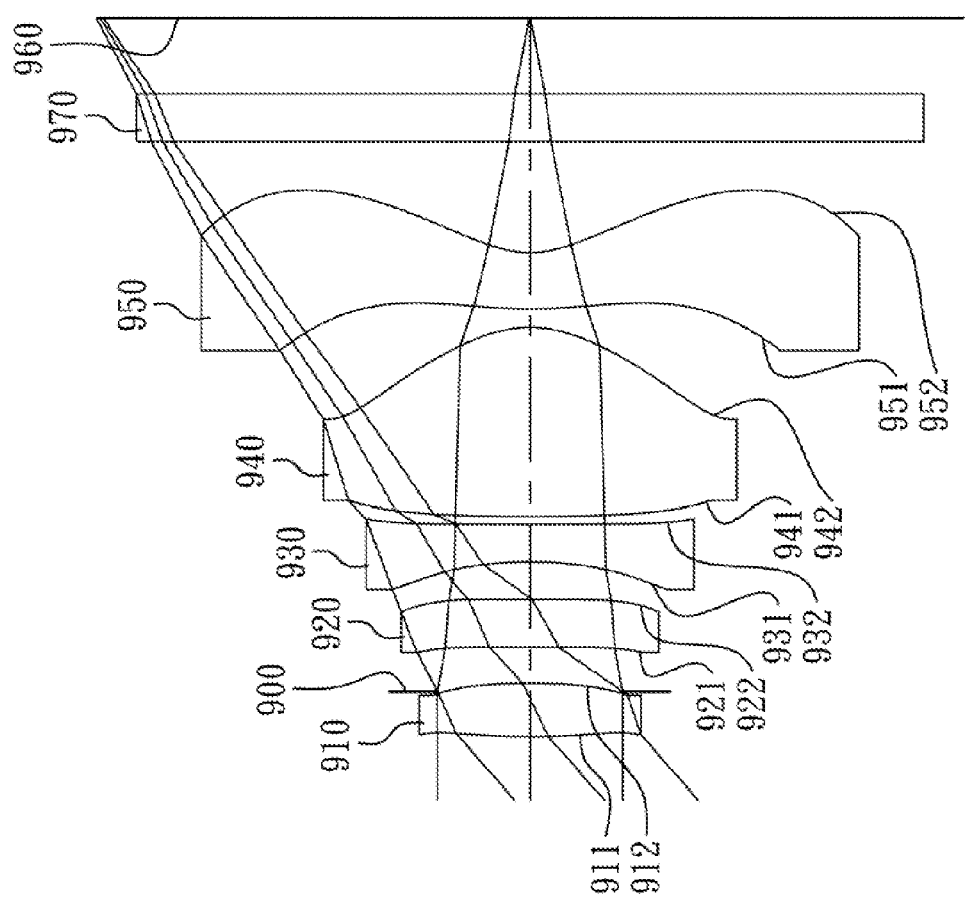
FIG. 17 is a schematic view of an optical image lens assembly according to the 9th embodiment of the present disclosure.
Figure 18:
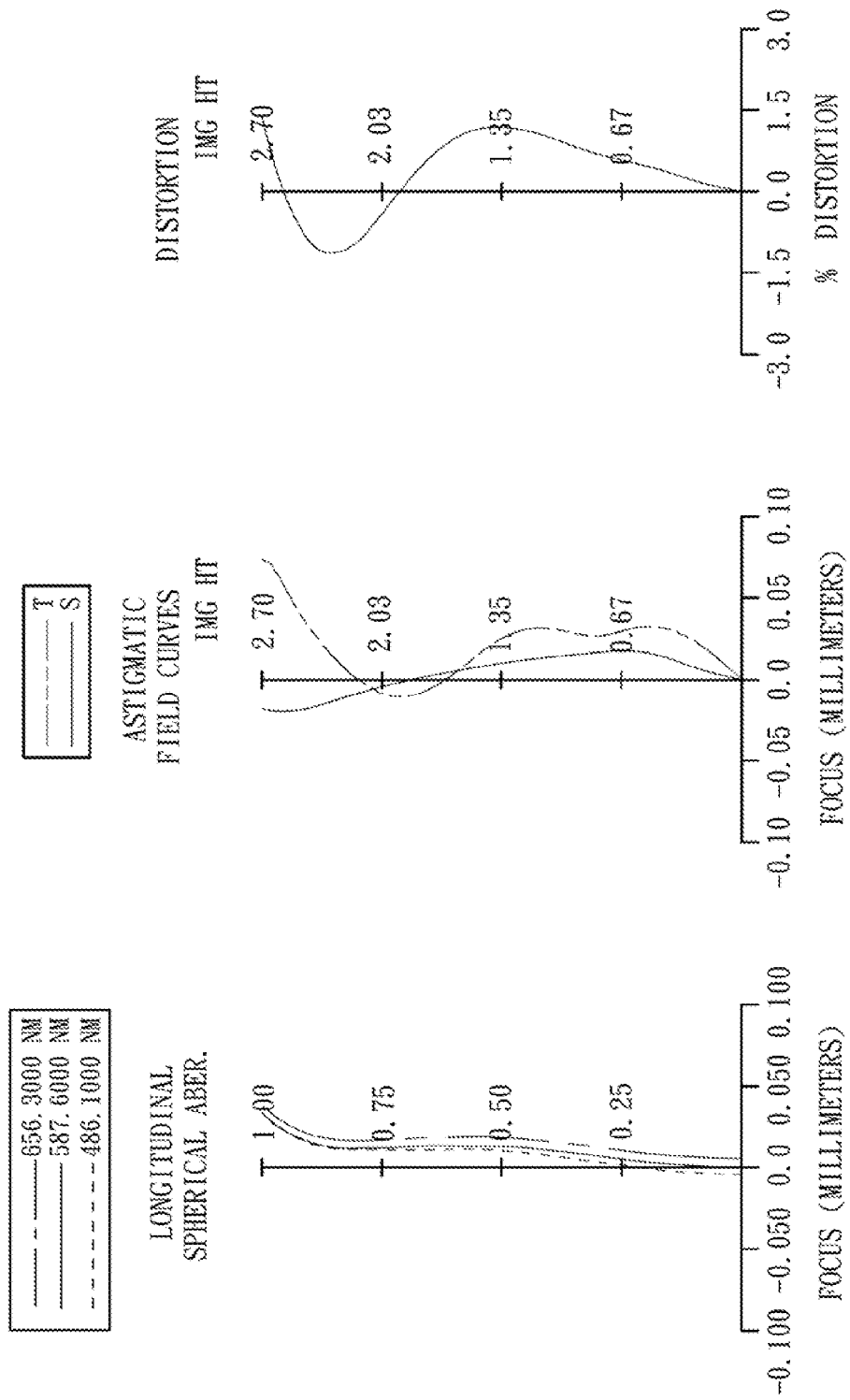
FIG. 18 shows spherical aberration curves, astigmatic field curves and a distortion curve of the optical image lens assembly according to the 9th embodiment.

FIG. 17 is a schematic view of an optical image lens assembly according to the 9th embodiment of the present disclosure. FIG. 18 shows spherical aberration curves, astigmatic field curves and a distortion curve of the optical image lens assembly according to the 9th embodiment. In FIG. 17, the optical image lens assembly includes, in order from an object side to an image side, the first lens element 910 an aperture stop 900, the second lens element 920, the third lens element 930, the fourth lens element 940, the fifth lens element 950, an IR-cut filter 970 and an image plane 960.

The first lens element 910 with positive refractive power has a convex object-side surface 911 and a convex image-side surface 912, and is made of plastic material. The object-side surface 911 and the image-side surface 912 of the first lens element 910 are aspheric. Furthermore, the first lens element 910 has inflection points on the object-side surface 911 thereof.

The second lens element 920 with positive refractive power has a concave object-side surface 921 and a convex image-side surface 922, and is made of plastic material. The object-side surface 921 and the image-side surface 922 of the second lens element 920 are aspheric.

The third lens element 930 with negative refractive power has a concave object-side surface 931 and a concave image-side surface 932, and is made of plastic material. The object-side surface 931 and the image-side surface 932 of the third lens element 930 are aspheric.

The fourth lens element 940 with positive refractive power has a convex object-side surface 941 and a convex image-side surface 942, and is made of plastic material. The object-side surface 941 and the mage-side surface 942 of the fourth lens element 940 are aspheric.

The fifth lens element 950 with negative refractive power has a convex object-side surface 951 and a concave image-side surface 952, and is made of plastic material. The object-side surface 951 and the image-side surface 952 of the fifth lens element 950 are aspheric. Furthermore, the fifth lens element 950 has inflection points on the object-side surface 951 and the image-side surface 952 thereof.

The IR-cut filter 970 is made of glass, and located between the fifth lens element 950 and the image plane 960, and will not affect the focal length of the optical image lens assembly.

The detailed optical data of the 9th embodiment are shown in Table 17 and the aspheric surface data are shown in Table 18 below.

TABLE 17

9th Embodiment
f = 3.03 mm, Fno = 2.60, HFOV = 41.2 deg.

| Surface # |  | Curvature Radius | Thickness | Material | index | Abbe # | Focal length |
|---|---|---|---|---|---|---|---|
| 0 | Object | Plano | Infinity |  |  |  |  |
| 1 | Lens 1 | 3.991 (ASP) | 0.337 | Plastic | 1.544 | 55.9 | 3.55 |
| 2 |  | −3.628 (ASP) | −0.053 |  |  |  |  |
| 3 | Ape. Stop | Plano | 0.283 |  |  |  |  |
| 4 | Lens 2 | −75.614 (ASP) | 0.298 | Plastic | 1.650 | 21.4 | 167.63 |
| 5 |  | −44.697 (ASP) | 0.235 |  |  |  |  |
| 6 | Lens 3 | −2.534 (ASP) | 0.240 | Plastic | 1.650 | 21.4 | −3.77 |
| 7 |  | 75.075 (ASP) | 0.050 |  |  |  |  |
| 8 | Lens 4 | 17.211 (ASP) | 1.188 | Plastic | 1.530 | 55.8 | 1.28 |
| 9 |  | −0.689 (ASP) | 0.119 |  |  |  |  |
| 10 | Lens 5 | 2.988 (ASP) | 0.350 | Plastic | 1.544 | 55.9 | −1.41 |
| 11 |  | 0.586 (ASP) | 0.700 |  |  |  |  |
| 12 | IR-cut filter | Plano | 0.300 | Glass | 1.517 | 64.2 | — |
| 13 |  | Plano | 0.476 |  |  |  |  |
| 14 | Image | Plano | — |  |  |  |  |

Note:
Reference wavelength (d-line) is 587.6 nm.

TABLE 18

Aspheric Coefficients

| Surface # | 1 | 2 | 4 | 5 | 6 |
|---|---|---|---|---|---|
| k = | −1.0000E+00 | −5.0000E+01 | −5.0000E+01 | −1.0000E+00 | −1.6622E+01 |
| A4 = | −9.4309E−02 | −2.1428E−01 | 6.8379E−03 | −6.6708E−03 | −1.4290E−01 |
| A6 = | −1.5370E−01 | −2.4932E−02 | −3.3997E−01 | −3.8811E−01 | −8.2356E−02 |
| A8 = | 3.9108E−02 | −2.3695E−01 | 3.9820E−01 | 3.2437E−01 | 2.2952E−02 |
| A10 = | −3.8976E−01 | 2.4173E−01 | −9.8008E−01 | −3.7977E−01 | 3.7445E−01 |
| A12 = | 3.5257E−02 | −2.9449E−01 | 1.2848E+00 | 2.1951E−01 | −2.5229E−01 |
| A14 = | −7.8809E−02 | 1.4813E−01 | −3.2624E−01 | 1.7411E−01 |  |

| Surface # | 7 | 8 | 9 | 10 | 11 |
|---|---|---|---|---|---|
| k = | −1.0000E+00 | −5.0000E+01 | −4.0898E+00 | −3.5511E+01 | −4.2681E+00 |
| A4 = | 1.4580E−02 | 2.2047E−03 | −2.0482E−01 | −1.0091E−01 | −9.1866E−02 |

TABLE 18-continued

Aspheric Coefficients

| A6 = | −7.6401E−02 | 1.1943E−01 | 2.2931E−01 | 7.4443E−03 | 3.1013E−02 |
|---|---|---|---|---|---|
| A8 = | 1.4279E−01 | −2.4212E−01 | −1.5957E−01 | −1.1009E−04 | −9.6271E−03 |
| A10 = | −4.7091E−02 | 2.6432E−01 | 6.3304E−02 | 7.2005E−04 | 1.7555E−03 |
| A12 = | −1.1638E−02 | −1.3810E−01 | 1.5251E−03 | 1.2472E−04 | −1.8274E−04 |
| A14 = | | 2.7635E−02 | −3.9101E−03 | −8.0904E−05 | 8.0828E−06 |

In the optical image lens assembly according to the 9th embodiment, the definitions of f, Fno, FOV, V1, V2, V3, R1, R2, R3, R4, R5, R6, R9, f2, T12, T23, T34, T45 and TD are the same as those stated in the 1st embodiment with corresponding values for the 9th embodiment. Moreover, these parameters can be calculated from Table 17 and Table 13 as the following values and satisfy the following relationships:

| f (mm) | 3.03 | R5/R4 | 0.06 |
|---|---|---|---|
| Fno | 2.60 | R9/f | 0.99 |
| HFOV (deg.) | 41.2 | (T34/R6) × 100 | 0.07 |
| (V2 + V3)/V1 | 0.77 | (T34 + T45)/(T12 + T23) | 0.36 |
| R2/R1 | −0.91 | f/f2 | 0.02 |
| (R3 − R4)/(R3 + R4) | 0.26 | TD (mm) | 3.05 |

10th Embodiment

Figure 19:
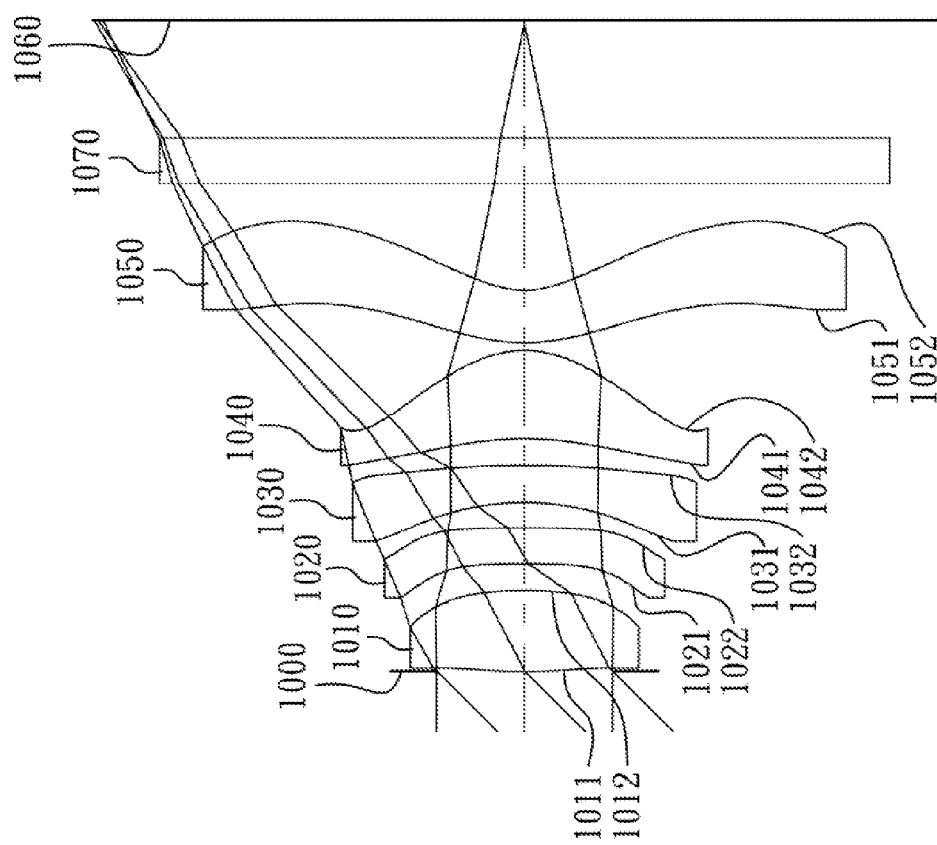
FIG. 19 is a schematic view of an optical image lens assembly according to the 10th embodiment of the present disclosure.
Figure 20:
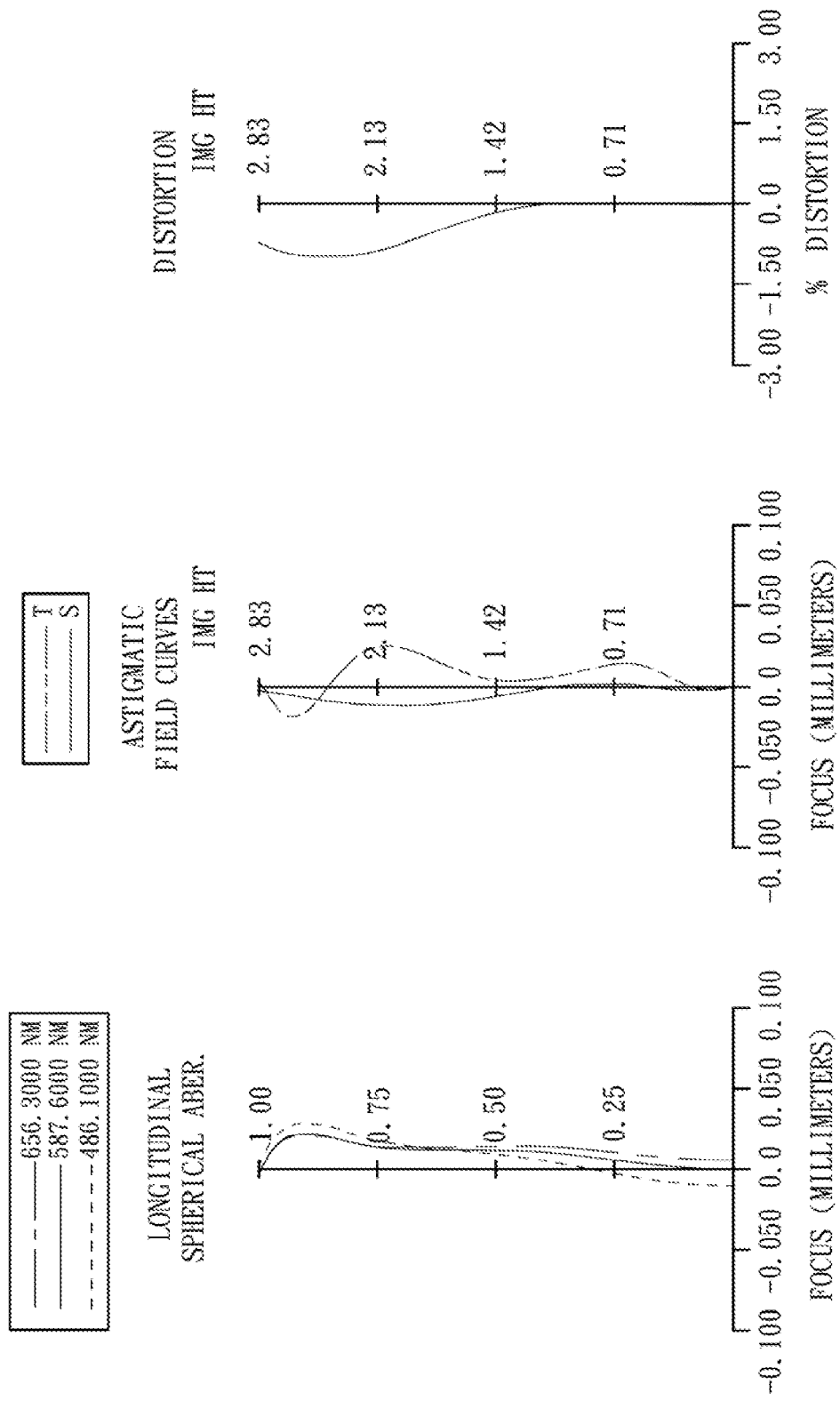
FIG. 20 shows spherical aberration curves, astigmatic field curves and a distortion curve of the optical image lens assembly according to the 10th embodiment.

FIG. 19 is a schematic view of an optical image lens assembly according to the 10th embodiment of the present disclosure. FIG. 20 shows spherical aberration curves, astigmatic field curves and a distortion curve of the optical image lens assembly according to the 10th embodiment. In FIG. 19, the optical image lens assembly includes, in order from an object side to an image side, an aperture stop 1000, the first lens element 1010, the second lens element 1020, the third lens element 1030, the fourth lens element 1040, the fifth lens element 1050, an IR-cut filter 1070 and an image plane 1060.

The first lens element 1010 with positive refractive power has a convex object-side surface 1011 and a convex image-side surface 1012, and is made of plastic material. The object-side surface 1011 and the image-side surface 1012 of the first lens element 1010 are aspheric. Furthermore, the first lens element 1010 has inflection points on the object-side surface 1011 thereof.

The second lens element 1020 with negative refractive power has a concave object-side surface 1021 and a convex image-side surface 1022, and is made of plastic material. The object-side surface 1021 and the image-side surface 1022 of the second lens element 1020 are aspheric.

The third lens element 1030 with negative refractive power has a concave object-side surface 1031 and a convex image-side surface 1032, and is made of plastic material. The object-side surface 1031 and the image-side surface 1032 of the third lens element 1030 are aspheric.

The fourth lens element 1040 with positive refractive power has a concave object-side surface 1041 and a convex image-side surface 1042, and is made of plastic material. The object-side surface 1041 and the image-side surface 1042 of the fourth lens element 1040 are aspheric.

The fifth lens element 1050 with negative refractive power has a convex object-side surface 1051 and a concave image-side surface 1052, and is made of plastic material. The object-side surface 1051 and the image-side surface 1052 of the fifth lens element 1050 are aspheric. Furthermore, the fifth lens element 1050 has inflection points on the object-side surface 1051 and the image-side surface 1052 thereof.

The IR-cut filter 1070 is made of glass, and located between the fifth lens element 1050 and the image plane 1060, and will not affect the focal length of the optical image lens assembly.

The detailed optical data of the 10th embodiment are shown in Table 19 and the aspheric surface data are shown in Table 20 below.

TABLE 19

10th Embodiment
f = 2.85 mm, Fno = 2.46, HFOV = 45.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.004 | | | | |
| 2 | Lens 1 | 3.420 (ASP) | 0.534 | Plastic | 1.544 | 55.9 | 3.01 |
| 3 | | −2.962 (ASP) | 0.177 | | | | |
| 4 | Lens 2 | −10.684 (ASP) | 0.240 | Plastic | 1.640 | 23.3 | −68.90 |
| 5 | | −14.225 (ASP) | 0.168 | | | | |
| 6 | Lens 3 | −1.665 (ASP) | 0.240 | Plastic | 1.640 | 23.3 | −3.52 |
| 7 | | −6.737 (ASP) | 0.177 | | | | |
| 8 | Lens 4 | −2.056 (ASP) | 0.582 | Plastic | 1.544 | 55.9 | 1.53 |
| 9 | | −0.652 (ASP) | 0.050 | | | | |
| 10 | Lens 5 | 1.233 (ASP) | 0.350 | Plastic | 1.544 | 55.9 | −2.34 |
| 11 | | 0.563 (ASP) | 0.700 | | | | |
| 12 | IR-cut filter | Plano | 0.300 | Glass | 1.517 | 64.2 | — |
| 13 | | Plano | 0.778 | | | | |
| 14 | Image | Plano | — | | | | |

Note:
Reference wavelength (d-line) is 587.6 nm.

TABLE 20

Aspheric Coefficients

| Surface # | 2 | 3 | 4 | 5 | 6 |
|---|---|---|---|---|---|
| k = | −2.8442E+01 | −1.0000E+00 | −1.0000E+00 | −1.0000E+00 | −8.5610E+00 |
| A4 = | −4.3310E−02 | −3.6557E−01 | −3.8688E−01 | −4.4988E−02 | −1.0840E−01 |
| A6 = | −1.5315E−01 | −2.5466E−01 | −5.8467E−01 | −5.9642E−01 | −6.5996E−02 |
| A8 = | −3.6835E−01 | 6.2856E−01 | 7.8210E−01 | 4.6128E−01 | −7.3886E−02 |
| A10 = | −1.2041E−01 | −5.9217E−01 | −4.9780E−01 | −3.1502E−01 | 4.4159E−01 |
| A12 = | 3.3207E−02 | −2.8870E−01 | 9.3792E−01 | 2.3059E−01 | −2.5268E−01 |
| A14 = | −7.8812E−02 | 1.4813E−01 | −3.2298E−01 | 9.8210E−02 | |

| Surface # | 7 | 8 | 9 | 10 | 11 |
|---|---|---|---|---|---|
| k = | −1.0000E+00 | 7.3111E−01 | −3.3768E+00 | −4.6527E+00 | −4.0558E+00 |
| A4 = | 1.9545E−02 | 1.3752E−01 | −2.7163E−01 | −8.6353E−02 | −8.2350E−02 |
| A6 = | −1.0843E−01 | 8.5553E−02 | 2.7415E−01 | 2.1665E−01 | 2.8257E−02 |
| A8 = | 1.4536E−01 | −2.6194E−01 | −1.3274E−01 | −3.1812E−03 | −9.0694E−03 |
| A10 = | −9.1409E−03 | 2.7473E−01 | 6.8803E−02 | 3.6025E−05 | 2.0162E−03 |
| A12 = | −4.2051E−02 | −1.3193E−01 | 4.7347E−03 | 1.0305E−04 | −2.7820E−04 |
| A14 = | | 2.3623E−02 | −9.1417E−03 | −1.2039E−05 | 1.7207E−05 |

In the optical image lens assembly according to the 10th embodiment, the definitions of f, Fno, FOV, V1, V2, V3, R1, R2, R3, R4, R5, R6, R9, f2, T12, T23, T34, T45 and TD are the same as those stated in the 1st embodiment with corresponding values for the 10th embodiment. Moreover, these parameters can be calculated from Table 19 and Table 20 as the following values and satisfy the following relationships:

| | | | |
|---|---|---|---|
| f (mm) | 2.85 | R5/R4 | 0.12 |
| Fno | 2.46 | R9/f | 0.43 |
| HFOV (deg.) | 45.0 | (T34/R6) × 100 | −2.63 |
| (V2 + V3)/V1 | 0.83 | (T34 + T45)/(T12 + T23) | 0.66 |
| R2/R1 | −0.87 | f/f2 | −0.04 |
| (R3 − R4)/(R3 + R4) | −0.14 | TD (mm) | 2.52 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical image lens assembly comprising, in order from an object side to an image side:
  a first lens element with positive refractive power having a convex object-side surface and a convex image-side surface;
  a second lens element with refractive power having a concave object-side surface and a convex image-side surface;
  a third lens element with refractive power having an object-side surface and an image-side surface being aspheric;
  a fourth lens element with positive refractive power having a convex image-side surface, wherein an object-side surface and the image-side surface of the fourth lens element are aspheric; and
  a fifth lens element with negative refractive power having a concave image-side surface, wherein an object-side surface and the image-side surface of the fifth lens element are aspheric, and the fifth lens element has at least one inflection point on at least one of the object-side surface and the image-side surface thereof;
  wherein a curvature radius of the object-side surface of the first lens element is R1, a curvature radius of the image-side surface of the first lens element is R2, a curvature radius of the object-side surface of the second lens element is R3, a curvature radius of the mage-side surface of the second lens element is R4, a curvature radius of the image-side surface of the third lens element is R6, an axial distance between the third lens element and the fourth lens element is T34, and the following relationships are satisfied:

$-1.0 \leq R2/R1 < 0;$ $-1.0 < (R3-R4)/(R3+R4) < 1.0;$ and $-8.0 < (T34/R6) \times 100 < 0.5.$ 2. The optical image lens assembly of claim 1, wherein the third lens element has a concave object-side surface.

3. The optical image lens assembly of claim 2, wherein the curvature radius of the image-side surface of the second lens element is R4, a curvature radius of the object-side surface of the third lens element is R5, and the following relationship is satisfied:

$0 < R5/R4 < 0.80.$

4. The optical image lens assembly of claim 3, wherein the third lens element has negative refractive power.

5. The optical image lens assembly of claim 4, wherein the fifth lens element has a convex object-side surface.

6. The optical image lens assembly of claim 5, wherein the curvature radius of the image-side surface of the third lens element is R6, the axial distance between the third lens element and the fourth lens element is T34, and the following relationship is satisfied:

$-6.0 < (T34/R6) \times 100 < 0.$

7. The optical image lens assembly of claim 2, wherein a focal length of the optical image lens assembly is f, a focal length of the second lens element is f2, and the following relationship is satisfied:

$-0.50 < f/f2 < 0.50.$

8. The optical image lens assembly of claim 7, wherein the focal length of the optical image lens assembly is f, the focal length of the second lens element is f2, and the following relationship is satisfied:

$$-0.50 < f/f2 < 0.$$

9. The optical image lens assembly of claim 2, wherein an Abbe number of the first lens element is V1, an Abbe number of the second lens element is V2, an Abbe number of the third lens element is V3, and the following relationship is satisfied:

$$0 < (V2+V3)/V1 < 1.0.$$

10. The optical image lens assembly of claim 2, wherein an axial distance between the object-side surface of the first lens element and the image-side surface of the fifth lens element is TD, and the following relationship is satisfied:

$$2.0 \text{ mm} < TD < 4.5 \text{ mm}.$$

11. The optical image lens assembly of claim 1, wherein the third lens element has negative refractive power.

12. The optical image lens assembly of claim 11, wherein an axial distance between the first lens element and the second lens element is T12, an axial distance between the second lens element and the third lens element is T23, the axial distance between the third lens element and the fourth lens element is T34, an axial distance between the fourth lens element and the fifth lens element is T45, and the following relationship is satisfied:

$$0 < (T34+T45)/(T12+T23) < 1.9.$$

13. The optical image lens assembly of claim 12, wherein the first lens element has at least one inflection point on the object-side surface thereof.

14. The optical image lens assembly of claim 12, wherein the curvature radius of the image-side surface of the third lens element is R6, the axial distance between the third lens element and the fourth lens element is T34, and the following relationship is satisfied:

$$-6.0 < (T34/R6) \times 100 < 0.$$

15. The optical image lens assembly of claim 1, wherein a half of the maximal field of view of the optical image lens assembly is HFOV, and the following relationship is satisfied:

$$38 \text{ degrees} < HFOV < 60 \text{ degrees}.$$

16. The optical image lens assembly of claim 15, wherein the half of the maximal field of view of the optical image lens assembly is HFOV, and the following relationship is satisfied:

$$40 \text{ degrees} < HFOV < 50 \text{ degrees}.$$

17. The optical image lens assembly of claim 15, wherein the first lens element has at least one inflection point on the object-side surface thereof, the curvature radius of the image-side surface of the second lens element is R4, a curvature radius of the object-side surface of the third lens element is R5, and the following relationship is satisfied:

$$0 < R5/R4 < 0.50.$$

18. An optical mage lens assembly comprising, in order from an object side to an image side:
   a first lens element with positive refractive power having a convex object-side surface and a convex image-side surface;
   a second lens element with refractive power having a concave object-side surface and a convex image-side surface;
   a third lens element with refractive power having an object-side surface and an image-side surface being aspheric;
   a fourth lens element with positive refractive power having a convex image-side surface, wherein an object-side surface and the image-side surface of the fourth lens element are aspheric; and
   a fifth lens element with negative refractive power having a convex object-side surface and a concave image-side surface, wherein the object-side surface and the image-side surface of the fifth lens element are aspheric, and the fifth lens element has at least one inflection point on at least one of the object-side surface and the image-side surface thereof;
   wherein a curvature radius of the object-side surface of the first lens element is R1, a curvature radius of the image-side surface of the first lens element is R2, a curvature radius of the object-side surface of the second lens element is R3, a curvature radius of the image-side surface of the second lens element is R4, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a curvature radius of the object-side surface of the fifth lens element is R9, a focal length of the optical image lens assembly is f, and the following relationships are satisfied:

$$-1.0 \leq R2/R1 < 0;$$

$$-1.0 < (R3-R4)/(R3+R4) < 1.0;$$

$$0 < (T34+T45)/(T12+T23) < 1.9; \text{ and}$$

$$0 < R9/f < 2.0.$$

19. The optical image lens assembly of claim 18, wherein the third lens element has negative refractive power.

20. The optical image lens assembly of claim 19, wherein a curvature radius of the image-side surface of the third lens element is R6, the axial distance between the third lens element and the fourth lens element is T34, and the following relationship is satisfied:

$$-6.0 < (T34/R6) \times 100 < 0.$$

21. The optical image lens assembly of claim 19, wherein the focal length of the optical image lens assembly is f, a focal length of the second lens element is f2, and the following relationship is satisfied:

$$-0.50 < f/f2 < 0.50.$$

22. The optical image lens assembly of claim 19, wherein the image-side and the object-side surfaces of the first lens element and the second lens element are aspheric, and the first through fifth lens elements are made of plastic material.

23. An optical mage lens assembly comprising, in order from an object side to an image side:
   a first lens element with positive refractive power having a convex object-side surface and a convex image-side surface;
   a second lens element with negative refractive power having a concave object-side surface and a convex image-side surface, wherein the object-side surface and the image-side surface of the second lens element are aspheric;
   a third lens element with refractive power having an object-side surface and an image-side surface being aspheric;
   a fourth lens element with positive refractive power having a convex image-side surface, wherein an object-side surface and the image-side surface of the fourth lens element are aspheric; and a fifth lens element with negative refractive power having a concave image-side surface, wherein an object-side surface and the image-side surface of the fifth lens element are aspheric, and the fifth lens element has at least one inflection point on at least of the object-side surface and the image-side surface thereof;

wherein a curvature radius of the object-side surface of the first lens element is R1, a curvature radius of the image-side surface of the first lens element is R2, a curvature radius of the object-side surface of the second lens element is R3, a curvature radius of the image-side surface of the second lens element is R4, a curvature radius of the image-side surface of the third lens element is R6, an axial distance between the third lens element and the fourth lens element is T34, and the following relationships are satisfied:

$-2.0 < R2/R1 < 0$;

$-1.0 < (R3-R4)/(R3+R4) < 1.0$, and $-8.0 < (T34/R6) \times 100 < 0.5$.

24. The optical image lens assembly of claim 23, wherein the curvature radius of the object-side surface of the first lens element is R1, the curvature radius of the image-side surface of the first lens element is R2, and the following relationship is satisfied:

$-1.0 \leq R2/R1 < 0$.

25. The optical image lens assembly of claim 24, wherein the first lens element has at least one inflection point on the object-side surface thereof.

26. The optical image lens assembly of claim 24, wherein the third lens element with negative refractive power has a concave object-side surface and a convex image-side surface, the fourth lens element has a concave object-side surface, and the fifth lens element has a convex object-side surface.

27. The optical image lens assembly of claim 23, wherein a half of the maximal field of view of the optical image lens assembly is HFOV, and the following relationship is satisfied:

40 degrees < $HFOV$ < 50 degrees.

* * * * *

UNITED STATES PATENT AND TRADEMARK OFFICE
CERTIFICATE OF CORRECTION

PATENT NO. : 8,649,115 B2  Page 1 of 1
APPLICATION NO. : 13/615787
DATED : February 11, 2014
INVENTOR(S) : Chun-Shan Chen, Chih-Wen Hsu and Hsin-Hsuan Huang It is certified that error appears in the above-identified patent and that said Letters Patent is hereby corrected as shown below:

In the Specification (1) In column 12, line 14, 2nd Embodiment of the issued patent reads as "... and the mage-side surface 242 ...", but it should read as "... and the image-side surface 242 ...".
(2) In column 14, line 35, 3rd Embodiment of the issued patent reads as "... and the mage-side surface 342 ...", but it should read as "... and the image-side surface 342 ...".
(3) In column 16, line 56, 4th Embodiment of the issued patent reads as "... and the mage-side surface 442 ...", but it should read as "... and the image-side surface 442 ...".
(4) In column 20, line 2, 5th Embodiment of the issued patent read as "... and the mage-side surface 542 ...", but it should read as "... and the image-side surface 542 ...".
(5) In column 22, line 18, 6th Embodiment of the issued patent reads as "... and the mage-side surface 642 ...", but it should read as "... and the image-side surface 642 ...".
(6) In column 24, line 36, 7th Embodiment of the issued patent reads as "... and the mage-side surface 742 ...", but it should read as "... and the image-side surface 742 ...".
(7) In column 26, line 61, 8th Embodiment of the issued patent reads as "... and the mage-side surface 842 ...", but it should read as "... and the image-side surface 842 ...".
(8) In column 30, line 9, 9th Embodiment of the issued patent reads as "... and the mage-side surface 942 ...", but it should read as "... and the image-side surface 942 ...".

In the Claims (9) In column 34, line 31, Claim 1 of the issued patent reads as "... radius of the mage-side surface", but it should read as "... radius of the image-side surface".
(10) In column 35, line 58, Claim 18 of the issued patent reads as "... optical mage lens assembly", but it should read as "... optical image lens assembly ...".
(11) In column 36, line 52, Claim 23 of the issued patent reads as "... optical mage lens assembly", but it should read as "... optical image lens assembly ...".

Signed and Sealed this
Twenty-first Day of October, 2014

Michelle K. Lee
*Deputy Director of the United States Patent and Trademark Office*